(12) United States Patent
Mahdavikhah-Mehrabad et al.

(10) Patent No.: US 11,329,567 B2
(45) Date of Patent: May 10, 2022

(54) MERGED VOLTAGE-DIVIDER FORWARD CONVERTER

(71) Applicant: Appulse Power Inc., Toronto (CA)

(72) Inventors: Seyed-Behzad Mahdavikhah-Mehrabad, Toronto (CA); Nenad Vukadinovic, Toronto (CA)

(73) Assignee: Appulse Power Inc., Toronto (CA)

(*) Notice: Subject to any disclaimer, the term of this patent is extended or adjusted under 35 U.S.C. 154(b) by 0 days.

(21) Appl. No.: 16/849,153

(22) Filed: Apr. 15, 2020

(65) Prior Publication Data

US 2020/0244175 A1 Jul. 30, 2020

Related U.S. Application Data

(63) Continuation of application No. PCT/IB2018/057988, filed on Oct. 15, 2018.
(Continued)

(51) Int. Cl.
*H02M 3/335* (2006.01)
*H02M 1/34* (2007.01)

(52) U.S. Cl.
CPC ........ *H02M 3/33569* (2013.01); *H02M 1/34* (2013.01); *H02M 1/342* (2021.05); *H02M 1/348* (2021.05)

(58) Field of Classification Search
CPC ........ H02M 3/33553; H02M 3/33538; H02M 3/33546; H02M 3/3353; H02M 3/33569; H02M 1/34; H02M 1/342
See application file for complete search history.

(56) References Cited

U.S. PATENT DOCUMENTS

| 4,685,039 A | * | 8/1987 | Inou | ......... | H02M 3/33569 323/289 |
| 4,890,210 A | * | 12/1989 | Myers | ......... | H02M 3/33507 363/21.11 |

(Continued)

FOREIGN PATENT DOCUMENTS

| JP | 2007104881 A | 4/2007 |
| JP | 2008187817 A | 8/2008 |

(Continued)

OTHER PUBLICATIONS

International Search Report dated Jan. 28, 2019 for PCT Patent Application No. PCT/IB2018/057988.
(Continued)

*Primary Examiner* — Harry R Behm
(74) *Attorney, Agent, or Firm* — MLO, a professional corp.

(57) ABSTRACT

A forward converter includes an input voltage source divided into multiple divided input voltage sources, each of which provides a portion of a total input voltage of the input voltage source. The forward converter includes an output circuit with an output capacitor, a transformer having multiple primary windings, a secondary winding, and a relaxation winding. Each primary winding is connected in series with a corresponding primary side switching device. A combination of the primary winding and the corresponding primary side switching device is in parallel with a corresponding divided voltage source. The secondary winding outputs a voltage via the output circuit. The relaxation winding is connected across the divided input voltage sources or the output capacitor. A controller circuit controls the primary side switching devices to control power flow from the input voltage source to the output capacitor based on an indication of a voltage across the output capacitor.

21 Claims, 22 Drawing Sheets

Related U.S. Application Data

(60) Provisional application No. 62/578,192, filed on Oct. 27, 2017.

(56) References Cited

U.S. PATENT DOCUMENTS

| | | | | |
|---|---|---|---|---|
| 5,646,832 | A * | 7/1997 | Pulhamus, Jr | H02M 3/3353 363/24 |
| 5,864,473 | A * | 1/1999 | Slack | H02M 3/33546 363/21.08 |
| 6,687,137 | B1 * | 2/2004 | Yasumura | H02M 3/338 363/21.01 |
| 2004/0022080 | A1 * | 2/2004 | Weinmeier | H02M 1/08 363/132 |
| 2004/0042237 | A1 * | 3/2004 | Hsieh | H02M 3/33569 363/21.08 |
| 2005/0201128 | A1 * | 9/2005 | Jin | H02M 1/34 363/56.01 |
| 2010/0182810 | A1 | 7/2010 | Ashikaga | |
| 2011/0194317 | A1 | 8/2011 | Truettner et al. | |
| 2013/0063853 | A1 * | 3/2013 | Lin | H01L 24/49 361/91.7 |
| 2014/0035477 | A1 * | 2/2014 | Han | H02M 1/4258 315/201 |
| 2015/0023063 | A1 | 1/2015 | Perreault et al. | |
| 2015/0207423 | A1 * | 7/2015 | Ganesh Kumar | H02M 3/33553 363/21.05 |
| 2016/0204627 | A1 * | 7/2016 | Wang | H02J 7/0016 320/118 |
| 2016/0276923 | A1 * | 9/2016 | Hayakawa | H02M 3/335 |
| 2017/0012547 | A1 | 1/2017 | Jitaru | |
| 2017/0085183 | A1 | 3/2017 | Notsch | |

FOREIGN PATENT DOCUMENTS

| | | | |
|---|---|---|---|
| KR | 101478778 B1 | 1/2015 | |
| WO | 2016101058 A1 | 6/2016 | |
| WO | WO-2016101058 A1 * | 6/2016 | H02M 1/08 |
| WO | 2018075793 A1 | 4/2018 | |
| WO | 2018166205 A1 | 9/2018 | |

OTHER PUBLICATIONS

LT8310 datasheet, Linear Technology, 2014, 36 pages, Accessed online on Sep. 26, 2018: www.linear.com/LT8310.

* cited by examiner

MERGED VOLTAGE-DIVIDER FORWARD CONVERTER

RELATED APPLICATIONS

This application is a continuation of PCT International Application No. PCT/IB2018/057988 filed on Oct. 15, 2018, and entitled "Merged Voltage-Divider Forward Converter", which claims priority to U.S. Provisional Patent Application No. 62/578,192 filed on Oct. 27, 2017, and entitled "Merged Capacitive-Divider Forward Converter," all of which are hereby incorporated by reference for all purposes.

BACKGROUND

Switched mode power supplies (SMPSs) are widely used in various industrial and consumer electronic devices for the purpose of regulating an input voltage from an alternating current (AC) power source or a direct current (DC) power source such that a regulated output voltage/current may be delivered to an electronic load.

The circuits that make up an SMPS typically include a single-switch forward converter. Single-switch forward converter circuits are typically used when supplying loads that require tens to hundreds of watts of power with relatively high current. A single-switch forward converter circuit conveniently provides continuous output current and galvanic isolation between an input of the single-switch forward converter and an output of the single-switch forward converter.

In the application of the single-switch forward converter to a situation wherein a large input-to-output voltage difference is to be present, the conventional single-switch forward converter has certain limitations. These limitations may be seen to include a requirement for high voltage rated switches and a requirement for challenging transformer design. These limitations may be seen to result in a reduction of efficiency and an increase in size of the single-switch forward converter.

SUMMARY

In some embodiments, a forward converter includes an input voltage source. The input voltage source is divided into multiple divided input voltage sources. Each of the divided input voltage sources provides a portion of a total input voltage of the input voltage source. The forward converter includes an output circuit which includes a first output circuit switching device, a second output circuit switching device, an output inductor, and an output capacitor. The forward converter includes a transformer having multiple primary windings coupled to a magnetic core, a secondary winding inductively coupled to the primary windings by being coupled to the magnetic core, and a relaxation winding inductively coupled to the magnetic core. Each primary winding among the multiple primary windings is connected in series with a corresponding primary side switching device. A combination of the primary winding and the corresponding primary side switching device is in parallel with a corresponding divided voltage source among the multiple divided voltage sources. The secondary winding is connected to output an output voltage via the output circuit, and the relaxation winding is connected across the multiple divided input voltage sources or the output capacitor. The forward converter includes a controller circuit that is connected to each of the primary side switching devices and adapted to control each of the primary side switching devices in a manner that controls power flow from the input voltage source to the output capacitor, the control being based on receipt of an indication of a voltage across the output capacitor.

Other aspects and features of the present disclosure will become apparent to those of ordinary skill in the art upon review of the following description of specific implementations of the disclosure in conjunction with the accompanying figures.

DETAILED DESCRIPTION

Figure 1:
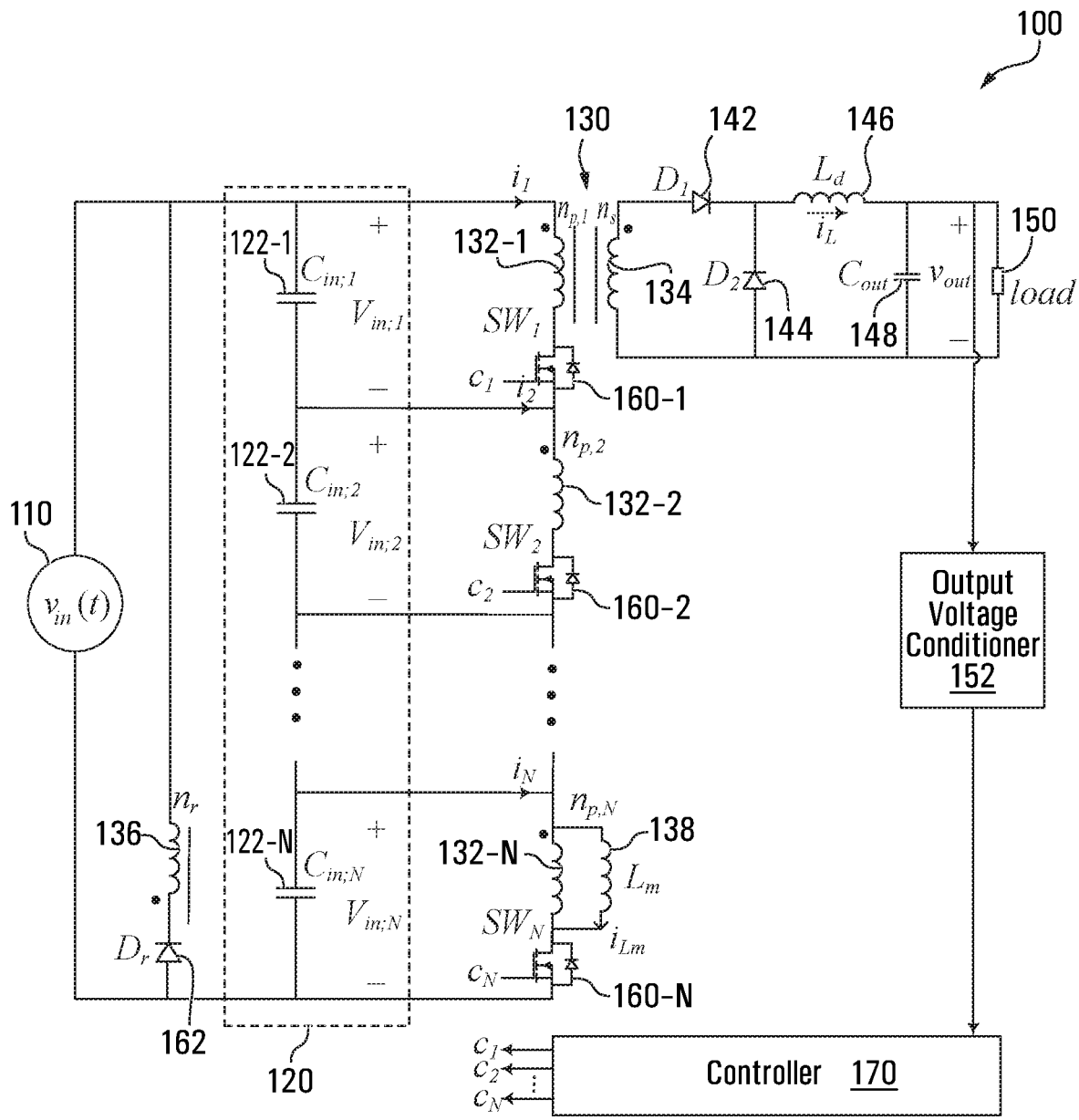
FIG. 1 schematically illustrates a merged voltage-divider forward converter, where a relaxation winding is connected across a generic input voltage source, in accordance with some embodiments.

Some embodiments disclosed herein involve a merged voltage-divider forward converter that is coupled to a series combination of divided input voltage sources to provide output power to a load. In some embodiments, the series combination of divided input voltage sources includes a series combination of capacitors. An input voltage source is coupled across the series combination of capacitors and each capacitor acts as a divided input voltage source to provide a divided voltage level, i.e., a portion, of the total input voltage to the forward converter. In other embodiments, the series combination of energy sources includes a series combination of battery cells. Each battery cell provides a divided voltage level of the total input voltage provided to the forward converter.

An input stage of the forward converter is galvanically isolated from an output stage of the forward converter by a transformer. As disclosed herein, the transformer has multiple primary windings and each of the primary windings is coupled to a respective divided voltage source of the series combination of divided input voltage sources. Each of the primary windings is further coupled in a series combination with a respective primary side switching device to control a current through the respective primary winding. Each series combination is coupled in parallel across a respective divided input voltage source. Due to the smaller, divided input voltages of either of the above embodiments (i.e., a capacitive divider or a string of battery cells), both a dimensional volume of the transformer and a power efficiency of the transformer can be optimized. The reduced volume of the transformer can significantly reduce the volume of the forward converters disclosed herein. Such optimization is achieved by reducing a voltage swing across the transformer magnetizing inductance and across an output inductor of the forward converter.

Additionally, due to the smaller, divided input voltages of either of the above embodiments (i.e., a capacitive divider or a string of battery cells), the switching voltage of the primary side switching devices may be advantageously reduced. The reduced volt-seconds across magnetic elements and reduced switching voltages advantageously allow for use of reduced-size magnetic components relative to conventional designs. Conveniently, use of reduced-size magnetic components and lower switching voltages results in lower magnetic and switching losses, based on principles known in the field of multi-level converters. More specifically, the volume of the transformer can be minimized, thereby allowing for the use of low-voltage switching devices for the primary side switching devices. Typically, such low-voltage switching devices can be MOSFETs, bipolar junction transistors (BJTs) or insulated-gate bipolar transistors (IGBTs). Moreover, low-voltage MOSFETs are desirable for use as the primary side switching devices due to lower switching losses, lower conduction losses and lower cost associated with MOSFETs relative to BJTs and IGBTs.

Additionally, the forward converters disclosed herein advantageously reduce a peak magnitude of the input current while also lowering frequency harmonics of the input current. Such forward converters distribute input power losses over the multiple primary windings and primary side switching devices. Because of the reduced magnitude of the peak input current and because of the elimination of lower frequency harmonics of the input current, a corner frequency of an (EMI) input filter described herein (with reference to FIG. 3 and FIG. 4) can be increased, potentially reducing the volume of the input filter.

Further, a passive balancing of the input voltage across the divided input voltage sources can be obtained. For example, when a relatively small voltage misbalance condition occurs amongst the divided input voltage sources, one or more body diodes of the primary side switching devices can become forward biased, thus enabling electric charge to be redistributed from the capacitive device/battery cell with the largest voltage to other capacitive devices/battery cells with lower voltages. An equivalent circuit may be considered to have been formed during the charge redistribution. The equivalent circuit is an LC type, consisting of the input capacitances and leakage inductances. Such an LC type equivalent circuit may be seen to limit peak current magnitude. Thus, a maximum passive operation input voltage balancing can be obtained. Notably, the maximum passive operation input voltage misbalance may be shown to be less than the forward voltage of the body diode of the primary side switching device 160 (<1.2 volts usually).

FIG. 1 illustrates a forward converter 100 connected to receive an input voltage, $v_{in}(t)$, from a generic input voltage source 110, and output an output voltage, $v_{out}$, to an output load 150, in accordance with some embodiments. The generic input voltage source 110 is representative of either an AC voltage source or a DC voltage source.

The forward converter 100 includes a transformer 130 with a number, N, of primary windings including, for example, a first primary winding 132-1, a second primary winding 132-2, and an $N^{th}$ primary winding 132-N. The primary windings may be, individually or collectively, associated with reference numeral 132. A particular one of the primary windings 132 may be associated with reference numeral 132-$k$, where k is an integer selected from an array including integers from 1 to N, where N is the number of primary windings 132. The first primary winding 132-1 has a number of turns represented by $n_{p,1}$; the second primary winding 132-2 has a number of turns represented by $n_{p,2}$, and the $N^{th}$ primary winding 132-N has a number of turns represented by $n_{p,N}$.

The first primary winding 132-1 is inductively coupled to a secondary winding 134 of the transformer 130. The secondary winding 134 has a number of turns represented by $n_s$. A first node of the secondary winding 134 is connected to an anode of a first diode 142 ($D_1$) (i.e., a first output switching device), and a second node of the secondary winding 134 is connected to an anode of a second diode 144 ($D_2$) (i.e., a second output switching device). The cathodes of the diodes 142, 144 are connected to each other and to one terminal of an output inductor 146 (with a value represented by $L_d$). Though diodes 142, 144 are used to implement the particular embodiment of FIG. 1, each of the diodes 142, 144 may be understood to represent a device that is more generically a switch that operates as voltage-unidirectional and current-unidirectional. For example, in some embodiments, one or both of the diodes 142, 144 may instead be implemented as a MOSFET under active control.

The other terminal of the output inductor 146 is connected to a terminal of an output capacitor 148 (with a value represented by $C_{out}$) and to a terminal of the output load 150 to provide an output voltage $v_{out}$ to the output load 150. The other terminal of the output capacitor 148 is connected to the other terminal of the output load 150 and to the anode of the second diode 144.

The generic input voltage source 110 is connected to a capacitive divider 120 which divides the generic input voltage source 110 into a series of divided input voltage sources, each capacitive device of the capacitive divider 120 being one of the divided input voltage sources. The capacitive divider 120 has a first capacitive device 122-1 (with value $C_{in;1}$), a second capacitive device 122-2 (with value $C_{in;2}$), and an $N^{th}$ capacitive device 122-N (with value $C_{in;N}$) connected in series. The capacitive devices may be, individually or collectively, associated with reference numeral 122. A particular one of the capacitive devices may be associated with reference numeral 122-$k$, where k is an integer selected from an array including integers from 1 to N, where N is the number of primary windings 132 and the number of capacitive devices 122. The capacitive device 122-$k$ has a respective capacitance value $C_{in;k}$ associated therewith. In operation, the generic input voltage source 110 powers the forward converter 100 with an input voltage, $v_{in}(t)$. The capacitive divider 120 receives the input voltage $v_{in}(t)$. Along the capacitive divider 120, each one of the capacitive devices 122 provides a smaller, divided voltage $V_{in;k}$.

The forward converter 100 includes N primary side switching devices $SW_1$ 160-1 through $SW_N$ 160-N. FIG. 1 shows a first primary side switching device $SW_1$ 160-1, a second primary side switching device $SW_2$ 160-2, and an $N^{th}$ primary side switching device $SW_N$ 160-N. The primary side switching devices 160-1 through 160-N may be, individually or collectively, associated with reference numeral 160. A particular one of the primary side switching devices 160 may be associated with reference numeral 160-$k$, where k is an integer selected from an array including integers from 1 to N, where N is the number of primary windings 132, the number of capacitive devices 122, and the number of primary side switching devices 160. The primary side switching devices 160 can be advantageously provided in the form of metal-oxide-semiconductor field-effect transistors (MOSFETs), which can manage the relatively small divider voltages $V_{in;k}$.

Each primary winding 132-$k$ is connected to a corresponding primary side switching device 160-$k$ in a series combination. Each of these series combinations of a primary winding 132-$k$ and corresponding primary side switching device 160-$k$ is connected in parallel across a corresponding capacitive device 122-$k$ of the capacitive divider 120. For example, the first primary winding 132-1 is connected in a first series combination with the first primary side switching device 160-1, the first series combination being connected in parallel across the first capacitive device 122-1; the second primary winding 132-2 is connected in a second series combination with the second primary side switching device 160-2, the second series combination being connected in parallel across the second capacitive device 122-1, and the $N^{th}$ primary winding 132-N is connected in an $N^{th}$ series combination with the $N^{th}$ primary side switching device 160-N, the $N^{th}$ series combination being connected in parallel across the $N^{th}$ capacitive device 122-N.

The primary side switching devices 160 are operatively controlled by a controller circuit 170. In particular, the controller circuit 170 provides a first control signal $c_1$ to the first primary side switching device 160-1, provides a second control signal $c_2$ to the primary side second switching device 160-2, and provides an $N^{th}$ control signal $c_N$ to the $N^{th}$ primary side switching device 160-N.

When one of the primary side switching devices 160-$k$ is enabled (e.g., conducting current), the corresponding primary winding 132-$k$ may be characterized by a magnetizing inductance value $L_m$ illustrated as a representative inductor 138, with value $L_m$ that is connected in parallel with the $N^{th}$ primary winding 132-N. The magnetizing inductance value $L_m$ may vary with a dependence on which of the primary side switching devices 160 is enabled.

An output voltage conditioner 152 receives the output voltage, $v_{out}(t)$, and conditions the output voltage for use by the controller circuit 170. The output voltage conditioner 152 may, for example, condition the output voltage through the use of a combination of a resistive voltage divider (e.g., implementing an $$\frac{R_1}{R_1 + R_2}$$

transfer function, not shown) and a low-pass, $1^{st}$ order, RC filter (not shown). Thus, the output voltage conditioner 152 conditioning may act to step-down the output voltage and filter the output voltage before the conditioned output voltage is received by the controller circuit 170.

The forward converter 100 of FIG. 1 is configured to receive the input voltage $v_{in}(t)$ at the capacitive divider 120 and to successively and repeatedly operate, using the primary side switching devices 160, each one of the primary windings 132 using a portion, $V_{in;k}$, of the input voltage via the corresponding capacitive device 122 to generate the output voltage $v_{out}$ to the output load 150 of the forward converter 100. It is noted that the operation of the primary side switching devices 160 during use of the forward converter 100 can be performed in any sequential or logical order.

In operation, the controller circuit 170 may base control (through control signals $c_1, c_2, \ldots, c_N$) of the primary side switching devices 160 upon receiving, from the output voltage conditioner 152, a conditioned indication of a voltage across the output capacitor 148. Each one of the primary side switching devices 160 is operatively controlled by the controller circuit 170 for operating the forward converter 100 of FIG. 1 successively and repeatedly between an on-state (i.e., enabled) and an off-state (i.e., disabled). Advantageously, during normal use of the forward converter 100, only one primary side switching device 160 is operated at a time, thereby enabling distribution of power losses over all input stage components. Such distribution of power losses may be seen to act to minimize hot spots, thus reducing cooling requirements.

The forward converter 100 includes a relaxation winding 136 connected in series with a relaxation diode 162 ($D_r$). The relaxation winding 136 has a number of turns represented by $n_r$. Though the relaxation diode 162 is implemented as a diode in the embodiment shown, the relaxation diode 162 may be understood to represent a device that is more generically a switch that operates as voltage-unidirectional and current-unidirectional. For example, in some embodiments, the relaxation diode 162 may be implemented as a MOSFET under active control. In the embodiment shown in FIG. 1, the series combination of the relaxation winding 136 and the relaxation diode 162 is connected across and in parallel to the capacitive divider 120, and thus also across terminals of the generic input voltage source 110. Thus, each serial combination of a primary winding 132 and corresponding primary side switching device 160 is not coupled to a unique relaxation winding. In particular, one or more of the primary windings 132 (e.g., 132-2) are not directly connected to the relaxation winding 136. Further, one or more of the primary side switching devices 160 are not directly connected to the relaxation diode 162 and therefore are not directly coupled to the relaxation winding 136 through the relaxation diode 162. Further, though the first primary winding 132-1 is directly connected to the relaxation winding 136, the first primary side switching device 162-1 is not directly connected to the relaxation diode 162. Rather, the $N^{th}$ primary side switching device 160-N is directly connected to the relaxation diode 162.

Connecting a single relaxation winding (the relaxation winding 136) across the full input voltage source (the generic voltage input source 110), as opposed to a stacking of the forward converter primary structure which requires having individual relaxation windings and diodes for each primary structure of the stack, or having a relaxation winding across only one of the N primary windings, has multiple benefits. Compared to a multi-relaxation winding solution, the embodiment shown in FIG. 1 reduces the number of components required (e.g., diodes and windings) for relaxation by N−1 as compared to having N relaxation windings and diodes. Secondly, the embodiment shown in FIG. 1 helps achieve charge balance across the capacitive divider devices 122 and therefore achieves higher efficiency as compared to the aforementioned other two methods. This is because the magnetizing inductance energy of the forward converter 100 will charge the series combination of those capacitive devices 122. Thirdly, the embodiment shown in FIG. 1 reduces the number of winding turns required for relaxation winding by a factor of N as compared to a conventional forward converter to achieve similar performance and maximum allowable duty cycle (where the max duty cycle is $$\frac{0.5 n_{p,i}}{n_{p,i} + n_r/N}$$

for the embodiment of FIG. 1 as opposed to $$\frac{0.5 n_{p,i}}{n_{p,i} + n_r}$$

for a forward converter or the other two methods mentioned that can be used to connect relaxation winding/windings on the primary side).

Figure 2:
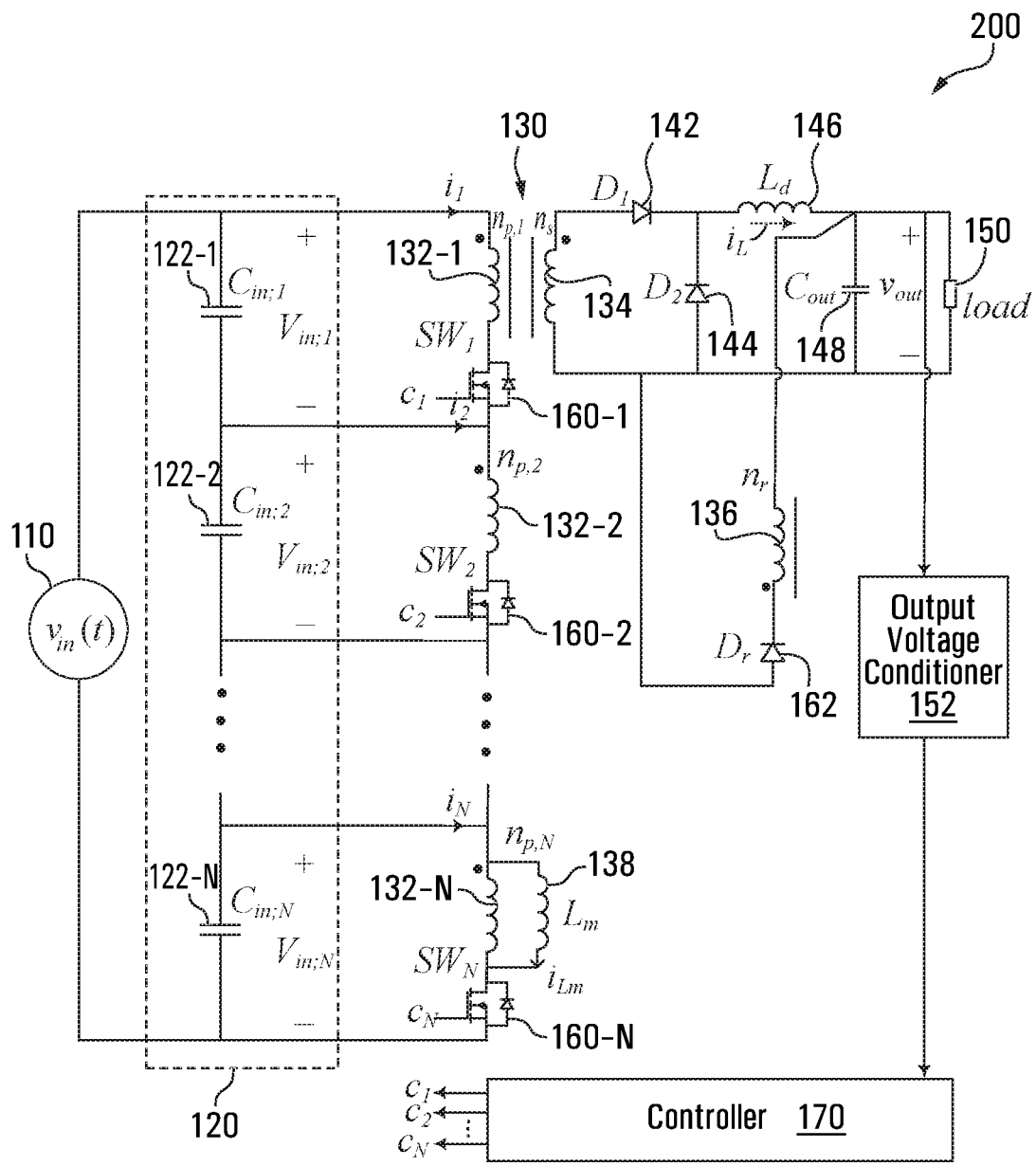
FIG. 2 schematically illustrates the merged voltage-divider forward converter of FIG. 1, where the relaxation winding is connected across an output load, in accordance with some embodiments.

In other embodiments, the series combination of the relaxation winding 136 and the relaxation diode 162 is connected to a terminal of an output capacitor 148. For example, FIG. 2, illustrates a forward converter 200 which is similar to the forward converter 100 of FIG. 1, but the forward converter 200 is configured such that the series combination of the relaxation winding 136 and the relaxation diode 162 are connected across the terminals of the output capacitor 148. Otherwise, aspects of the forward converter 200 are similar to the forward converter 100. That is, the forward converter 200 includes the generic input voltage source 110, the capacitive divider 120 with capacitive devices 122, the transformer 130 with primary windings 132 and secondary winding 134, the primary side switching devices 160, the diodes 142, 144, the output inductor 146, the output capacitor 148, the output load 150, the output voltage conditioner 152, the controller circuit 170, the relaxation winding 136 and the relaxation diode 162. The embodiment shown in FIG. 2 operates based on a different principle as compared to a conventional forward converter. That is, the magnetizing inductance 138 of the transformer 130 is advantageously used as a means of energy transfer to the output through the relaxation winding 136 as opposed to being a parasitic component generating extra loss. Therefore, opposite to a conventional forward converter where an ideal transformer with very high magnetizing inductance is needed to minimize magnetizing current of its magnetizing inductance 138 and therefore core losses, as well as resistive losses through components that carry the magnetizing inductance 138 current (namely, primary side semiconductor devices and primary side transformer windings), the transformer 130 can advantageously be designed to have much smaller magnetizing inductance 138 by up to three orders of magnitude therefore requiring significantly smaller number of winding turns, and thereby reducing transformer volume. This is enabled by the fact that the energy stored in the magnetizing inductance 138 and current going through it is used to transfer power to the output rather than being sent back and forth between $V_{in}$ and the magnetizing inductance 138 and eventually being dissipated as heat in methods where the relaxation winding 136 connects to the input. This transformer size reduction due to different principle of operation comes in addition to the transformer size reduction due to using multiple primary windings that reduces input voltage to the primary windings 132 by a factor of N and thereby reducing volt-seconds across the magnetic core, and also the reduced transformer division ratio for step-down applications. In addition, the transformer 130 can be advantageously designed with an air gap similar to that of a flyback transformer (which in principle is a coupled inductor where there magnetizing inductance 138 is used for power transfer rather than a true transformer that is needed by a conventional forward converter) to allow for higher saturation current.

Figure 3:
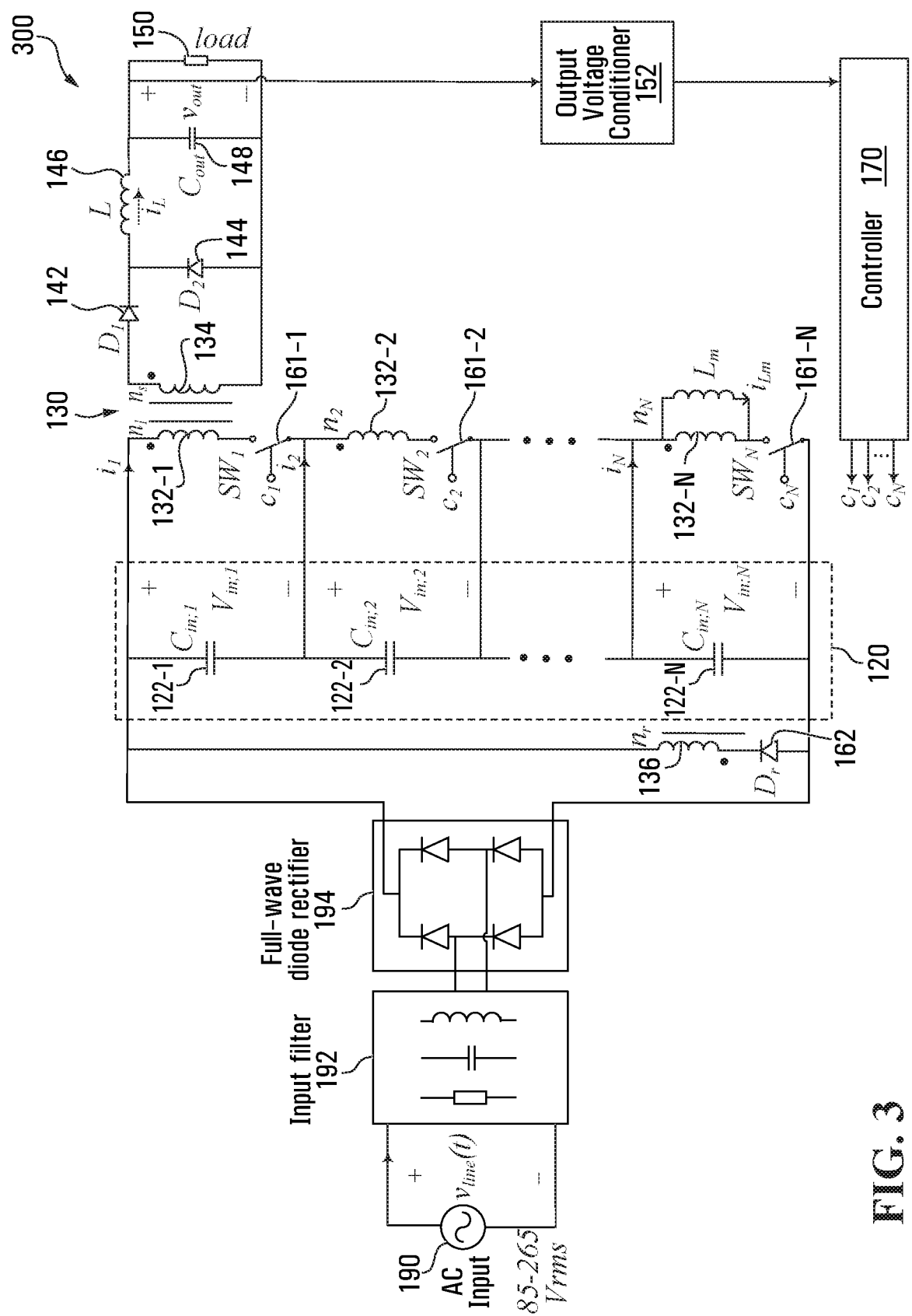
FIG. 3 schematically illustrates a merged voltage-divider forward converter adapted to convert an AC input voltage to DC output voltage, where a relaxation winding is connected across an input voltage source, in accordance with some embodiments.
Figure 4:
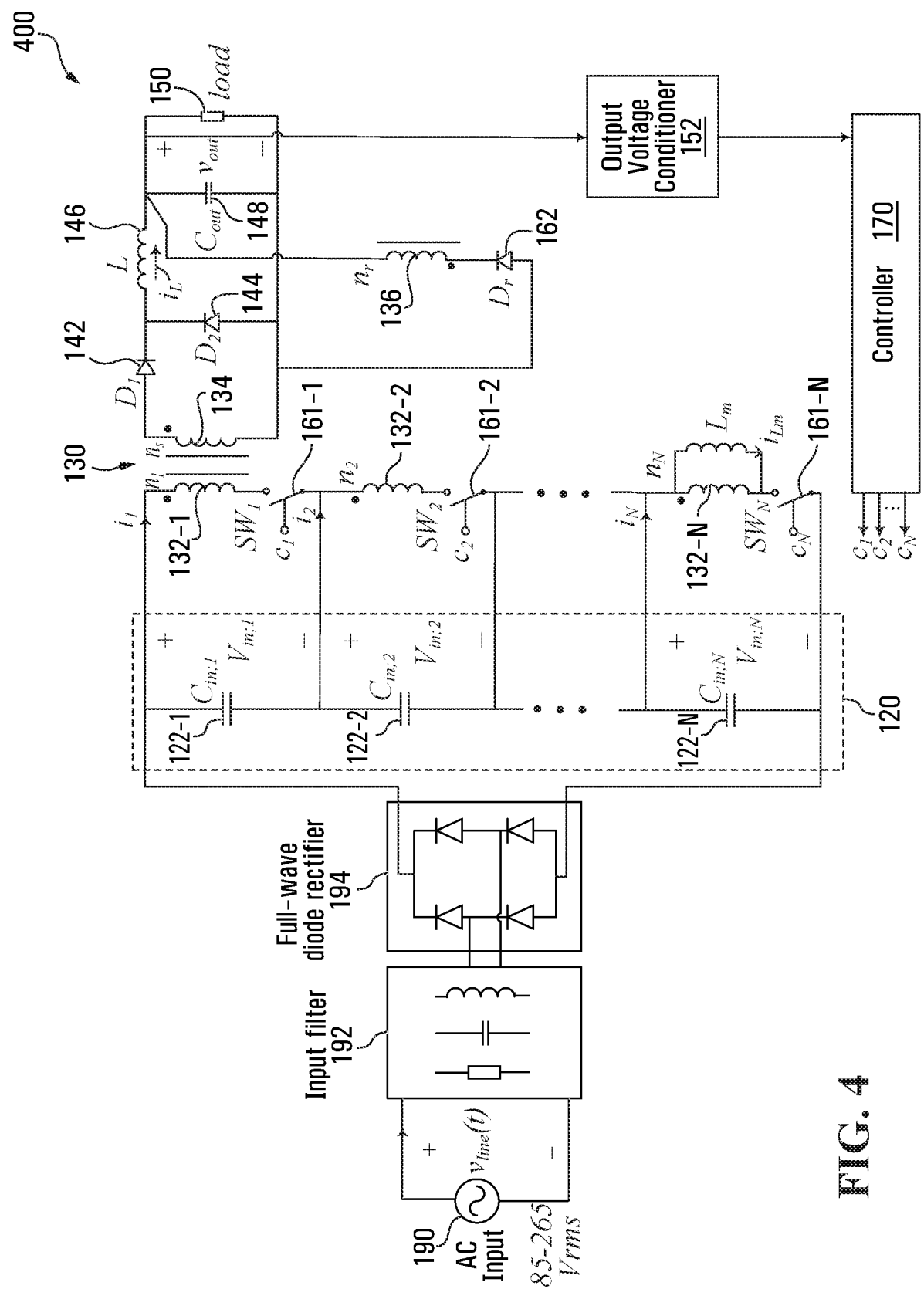
FIG. 4 schematically illustrates the merged voltage-divider forward converter of FIG. 3, where the relaxation winding is connected across an output load, in accordance with some embodiments.

FIG. 3 and FIG. 4 illustrate example embodiments of forward converters 300, 400 configured to receive an AC voltage, in accordance with some embodiments. The forward converter 300 is similar to the forward converter 100, and the forward converter 400 is similar to the forward converter 200. That is, each of the forward converters 300, 400 includes the capacitive divider 120 with capacitive devices 122, the transformer 130 with primary windings 132 and secondary winding 134, the diodes 142, 144, the output inductor 146, the output capacitor 148, the output load 150, the output voltage conditioner 152, the controller circuit 170, the relaxation winding 136 and the relaxation diode 162. As illustrated in FIG. 3 and FIG. 4, when configured to receive an AC voltage, the generic input voltage source 110 may include an AC input voltage source 190, an electromagnetic interference (EMI) input filter 192, and a full-wave diode rectifier 194. The forward converter 300 of FIG. 3 and FIG. 4 has the EMI input filter 192 operatively connected to the AC input voltage source 190 for providing a filtered input voltage either directly or indirectly to the capacitive divider 120. In the specific embodiment illustrated in FIGS. 3 and 4, the EMI input filter 192 is indirectly connected to the capacitive divider 120 via the full-wave diode rectifier 194. The full-wave diode rectifier 194 is generally provided to rectify the signal provided by the AC input voltage source 190.

In FIG. 3, the series combination of the relaxation winding 136 and the relaxation diode 162 is connected, as in FIG. 1, across input terminals of the forward converter 300 (across terminals of the full-wave diode rectifier 194). In FIG. 4, the series combination of the relaxation winding 136 and the relaxation diode 162 is connected, as in FIG. 2, across terminals of the output capacitor 148.

In both FIG. 3 and FIG. 4, the primary side MOSFET switching devices 160 (of FIGS. 1 and 2) are replaced with more general primary side single-pole, single throw switching devices. That is, the first MOSFET primary side switching device 160-1 (in FIGS. 1 and 2) is replaced (in FIGS. 3 and 4) with a first primary side single-pole, single throw switch 161-1. Further, the second primary side MOSFET switching device 160-2 (in FIGS. 1 and 2) is replaced (in FIGS. 3 and 4) with a second primary side single-pole, single throw switch 161-2. Still further, the $N^{th}$ primary side MOSFET switching device 160-N (in FIGS. 1 and 2) is replaced (in FIGS. 3 and 4) with an $N^{th}$ primary side single-pole, single throw switch 161-N. This further illustrates that for each of the embodiments disclosed herein, the primary side switching devices 160 can be more generally described as a switch which can include a FET, a MOSFET, a BJT, an IGBT, and so on.

Figure 5:
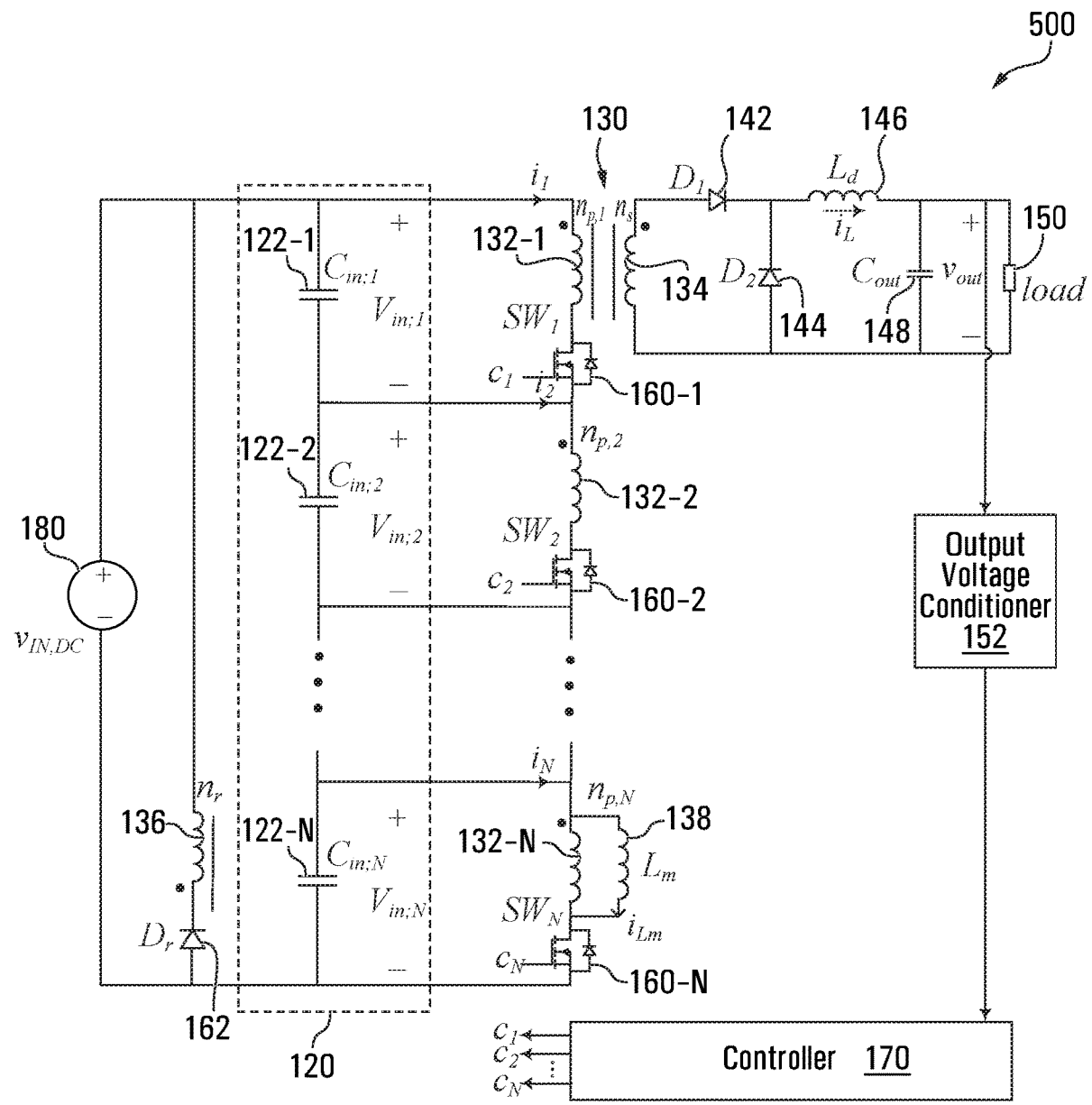
FIG. 5 schematically illustrates a merged voltage-divider forward converter adapted to convert a DC input voltage to a DC output voltage, where a relaxation winding is connected across an input port, in accordance with some embodiments.
Figure 6:
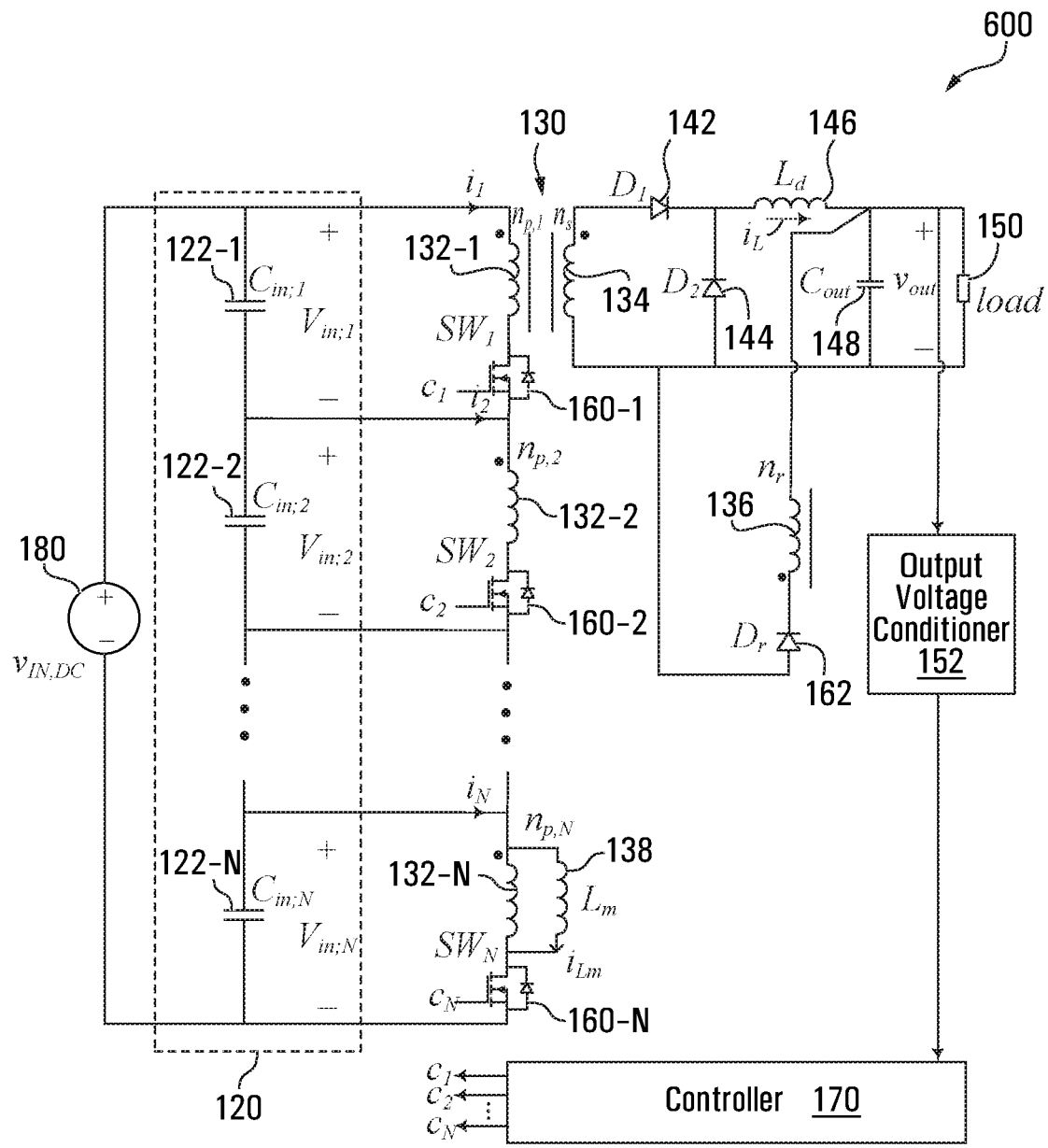
FIG. 6 schematically illustrates the merged voltage-divider forward converter of FIG. 5, where the relaxation winding is connected across an output load, in accordance with some embodiments.

FIG. 5 and FIG. 6 illustrate example embodiments of forward converters 500, 600 configured to receive a DC voltage input, in accordance with some embodiments. The forward converter 500 is similar to the forward converter 100, and the forward converter 600 is similar to the forward converter 200. That is, each of the forward converters 500, 600 includes the capacitive divider 120 with capacitive devices 122, the transformer 130 with primary windings 132 and secondary winding 134, the primary side switching devices 160, the diodes 142, 144, the output inductor 146, the output capacitor 148, the output load 150, the output voltage conditioner 152, the controller circuit 170, the relaxation winding 136 and the relaxation diode 162. As illustrated in FIG. 5 and FIG. 6, when configured for DC voltage input, the generic input voltage source 110 may be realized as a DC input voltage source 180. The forward converter 500 and the forward converter 600 are each connected between the DC input voltage source 180 and the output load 150 in accordance with aspects of the present application. In FIG. 5, the series combination of the relaxation winding 136 and the relaxation diode 162 is connected, as in FIG. 1 and FIG. 3, across input terminals of the forward converter 500, that is, across terminals of the DC input voltage source 180. In FIG. 6, the series combination of the relaxation winding 136 and the relaxation diode 162 is connected, as in FIG. 2 and FIG. 4, across terminals of the output capacitor 148.

Figure 7:
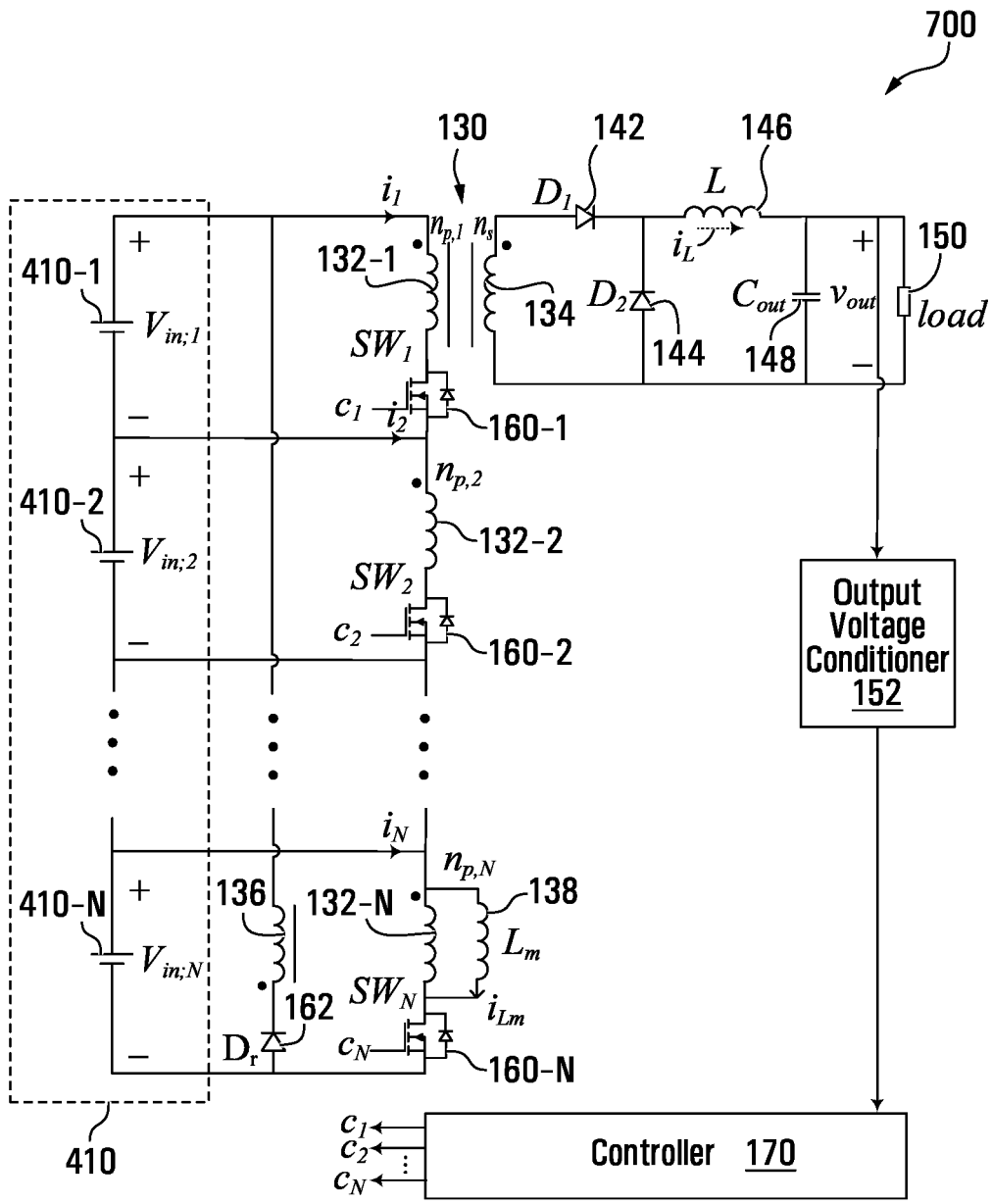
FIG. 7 schematically illustrates the merged voltage-divider forward converter of FIG. 1, with an input source formed as a battery string and with a relaxation winding connected to the top of the battery string, in accordance with some embodiments.
Figure 8:
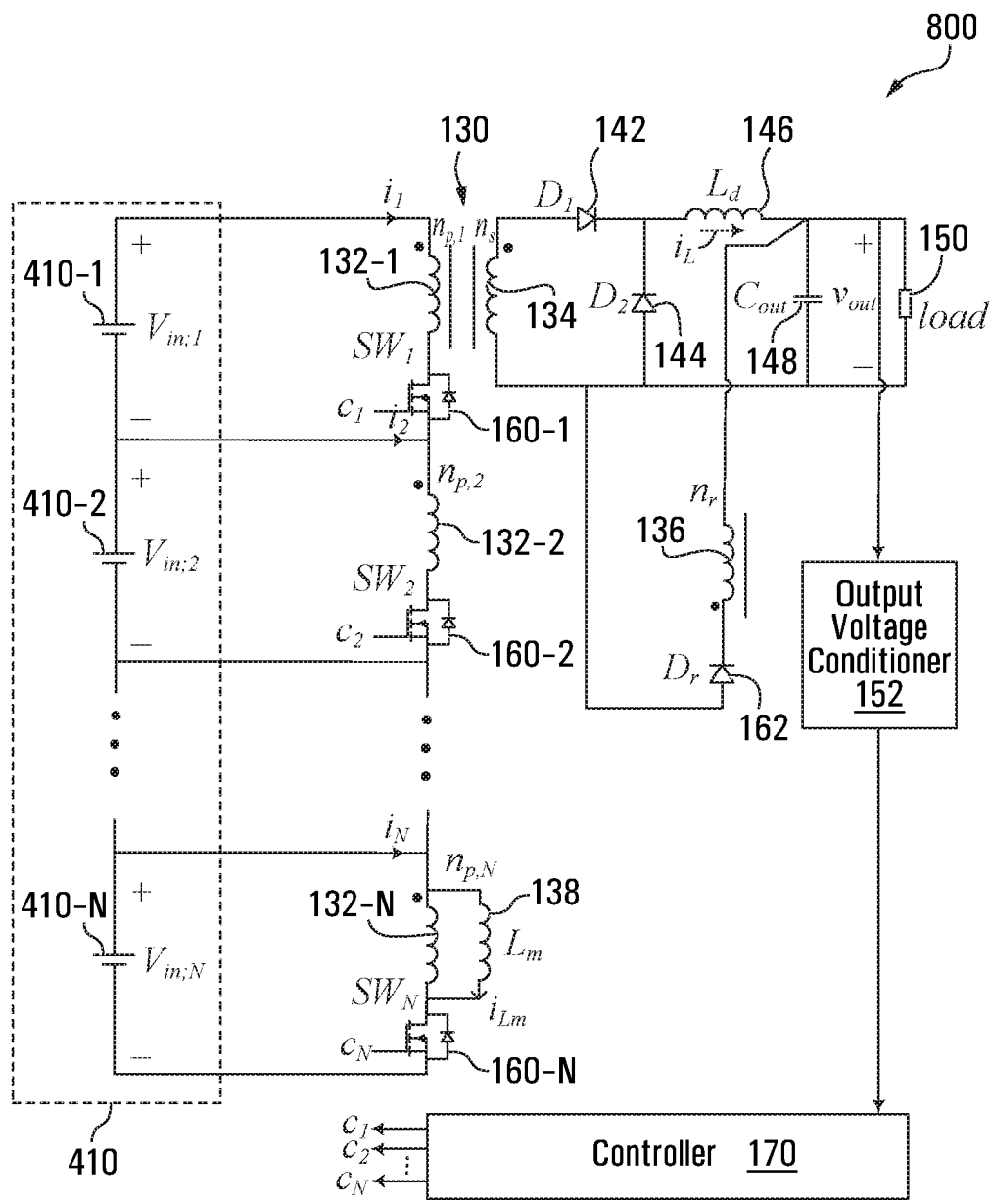
FIG. 8 schematically illustrates the merged voltage-divider forward converter of FIG. 2, with an input source formed as a battery string and with a relaxation winding connected across the output load, in accordance with some embodiments.

FIG. 7 and FIG. 8 illustrate additional example embodiments of forward converters 700, 800 configured to receive a DC voltage input, in accordance with some embodiments. The forward converter 700 is similar to the forward converter 100, and the forward converter 800 is similar to the forward converter 200. That is, each of the forward converters 700, 800 includes the transformer 130 with primary windings 132 and secondary winding 134, the primary side switching devices 160, the diodes 142, 144, the output inductor 146, the output capacitor 148, the output load 150, the output voltage conditioner 152, the controller circuit 170, the relaxation winding 136 and the relaxation diode 162. As illustrated in FIG. 7 and FIG. 8, when configured for DC voltage input, the generic input voltage source 110 can be realized as an input voltage source string. In the embodiment shown, the input voltage source string is realized as a battery string 410, each battery of the battery string 410 providing a divided input voltage. The battery string 410 may be implemented by N batteries in series combination, the series combination including: a first battery 410-1; a second battery 410-2; and an $N^{th}$ battery 410-N. A particular one of the batteries of the battery string 410 may be associated with reference numeral 410-$k$, where k is an integer selected from an array including integers from 1 to N, where N is the number of primary windings 132. Each battery 410-$k$ provides a divided input voltage $V_{in;k}$. For example, the battery 410-1 provides a voltage the battery 410-2 provides a voltage $V_{in;2}$, and the battery 410-N provides a voltage $V_{in;N}$. As shown, each series combination of a primary winding 132-$k$ and corresponding primary side switching device 160-$k$ is connected in parallel across a corresponding battery 410-$k$. In FIG. 7, the series combination of the relaxation winding 136 and the relaxation diode 162 is connected, as in FIGS. 1, 3 and 5, across the input terminals of the forward converter 700, now the top of the battery string 410. In FIG. 8, the series combination of the relaxation winding 136 and the relaxation diode 162 is connected, as in FIGS. 2, 4 and 6, across the terminals of the output capacitor 148.

Figure 9:
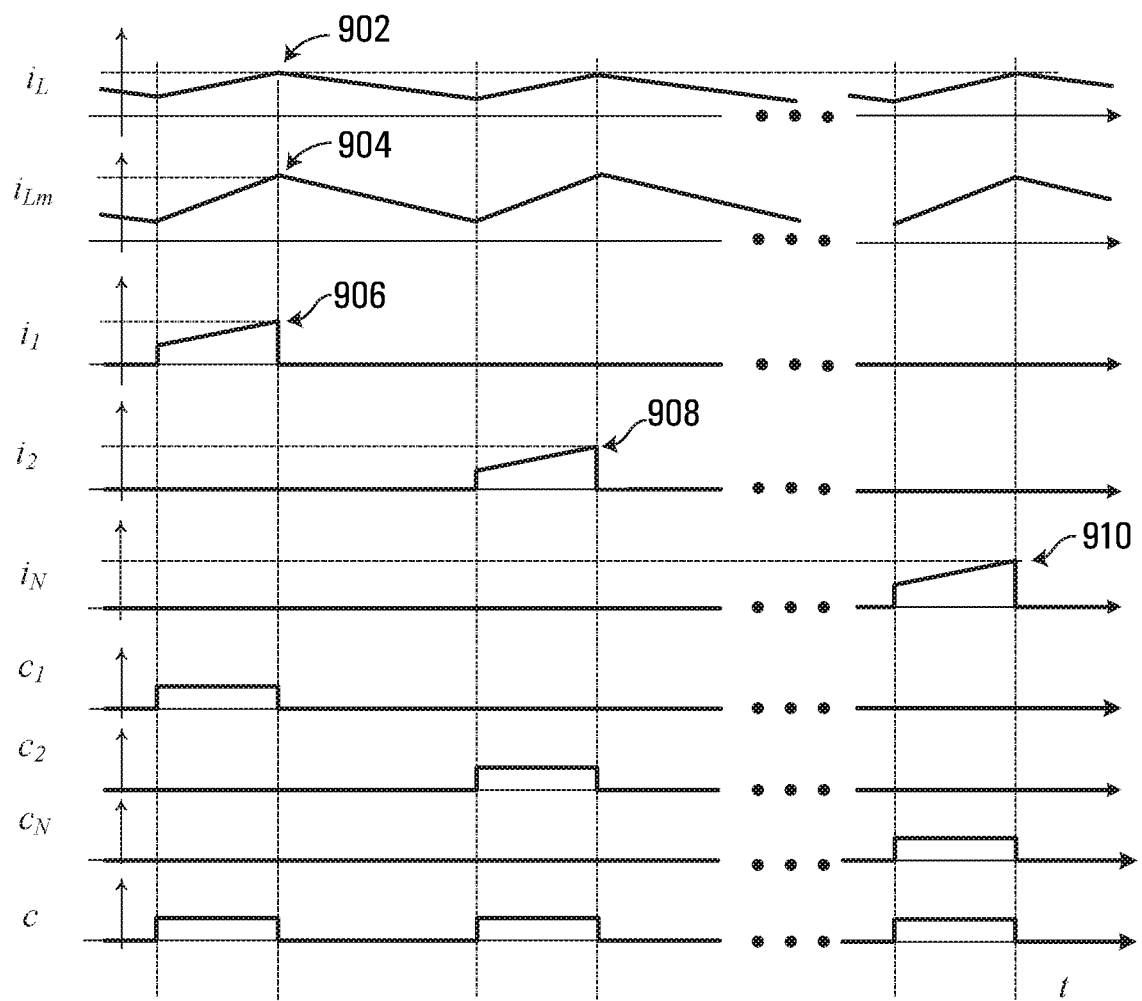
FIG. 9 illustrates switching signals for primary side switches and corresponding inductor current waveforms for a continuous conduction mode of operation, in accordance with some embodiments.

FIG. 9 illustrates simplified example switching signals for primary side switching devices 160 and corresponding inductor current waveforms in response to control signals $c_1$ through $c_N$ generated by the controller circuit 170, in accordance with some embodiments where the series combination of the relaxation winding 136 and the relaxation diode 162 is connected across the terminals of the output capacitor 148. A waveform c includes a series of pulses corresponding to an aggregate of control signals $c_1$ through $c_N$. That is, each pulse of waveform c corresponds to a pulse of one or more control signal $c_1$ through $c_N$. The switching waveforms of FIG. 9 depict a Continuous Conduction Mode (CCM) of operation for the case when output inductor 146 current $i_L$ continuous and magnetizing inductance 138 current $i_{LM}$ is continuous. That is, each of the currents $i_L$ and $i_{LM}$ maintain a value greater than 0.

When the first primary side switching device 160-1 is enabled responsive to a high value of control signal $c_1$, the first diode 142 is positively biased and conducts the current, while the second diode 144 and the relaxation diode 162 are reverse-biased. During this time, a current, $i_{Lm}$, through the magnetizing inductance 138, ramps up to an $i_{Lm}$ peak 904. The $i_{Lm}$ peak 904 is referred to herein as $I_{Lmp}$. Furthermore, the current, $i_L$, through the output inductor 146 ramps up, as well, to an $i_L$ peak 902. The $i_L$ peak 902 is referred to herein as $I_p$. The $i_L$ peak 902 illustrates the mode of operation where the output inductor 146 is operated in CCM mode. Furthermore, an $i_1$ peak 906 for the current, $i_1$, through the first primary winding 132-1 may be determined from $$\frac{n_{p;N}}{n_{p;1}} I_{Lmp} + \frac{n_s}{n_{p;1}} I_p.$$

Additionally, an $i_2$ peak 908 for the current, $i_2$, through the second primary winding 132-2 may be determined from $$\frac{n_{p;N}}{n_{p;2}} I_{Lmp} + \frac{n_s}{n_{p;2}} I_p,$$

and an $i_N$ peak 910 for the current, $i_N$, through the $N^{th}$ primary winding 132-N may be determined from $$I_{Lmp} + \frac{n_s}{n_{p;N}} I_p.$$

When none of the primary side switching devices 160 are enabled, the first diode 142 is reverse-biased, i.e., the first diode 142 is in the off-state. This event corresponds to the low value of the control signal $c_1, c_2, \ldots$, or of FIG. 9. In this case, as long as the inductor current, $i_L$, is still positive, the second diode 144 is positively biased, i.e., the second diode 144 is in an on-state. Additionally, as long as the magnetizing inductor current, $i_{Lm}$, is still positive, the relaxation diode 162 is positively biased, i.e., the relaxation diode 162 is also in the on-state. The second diode 144 conducts the current, $i_L$, that flows through the output inductor 146, while the relaxation diode 162 conducts the current, $i_{Lm}$, through the magnetizing inductance 138. During this time interval, as shown in FIG. 9, the current, $i_{Lm}$, through the magnetizing inductance 138 ramps down, and the current, $i_L$, of the output inductor 146 ramps down as well.

In accordance with the embodiment illustrated in FIG. 1, the magnetizing current, $i_{Lm}$, flows back to the generic input voltage source 110 when the relaxation diode 162 is in the on-state. In the embodiment illustrated in FIG. 2, the magnetizing current, $i_{Lm}$, flows to the output load 150 when the relaxation diode 162 is in the on-state.

Figure 10:
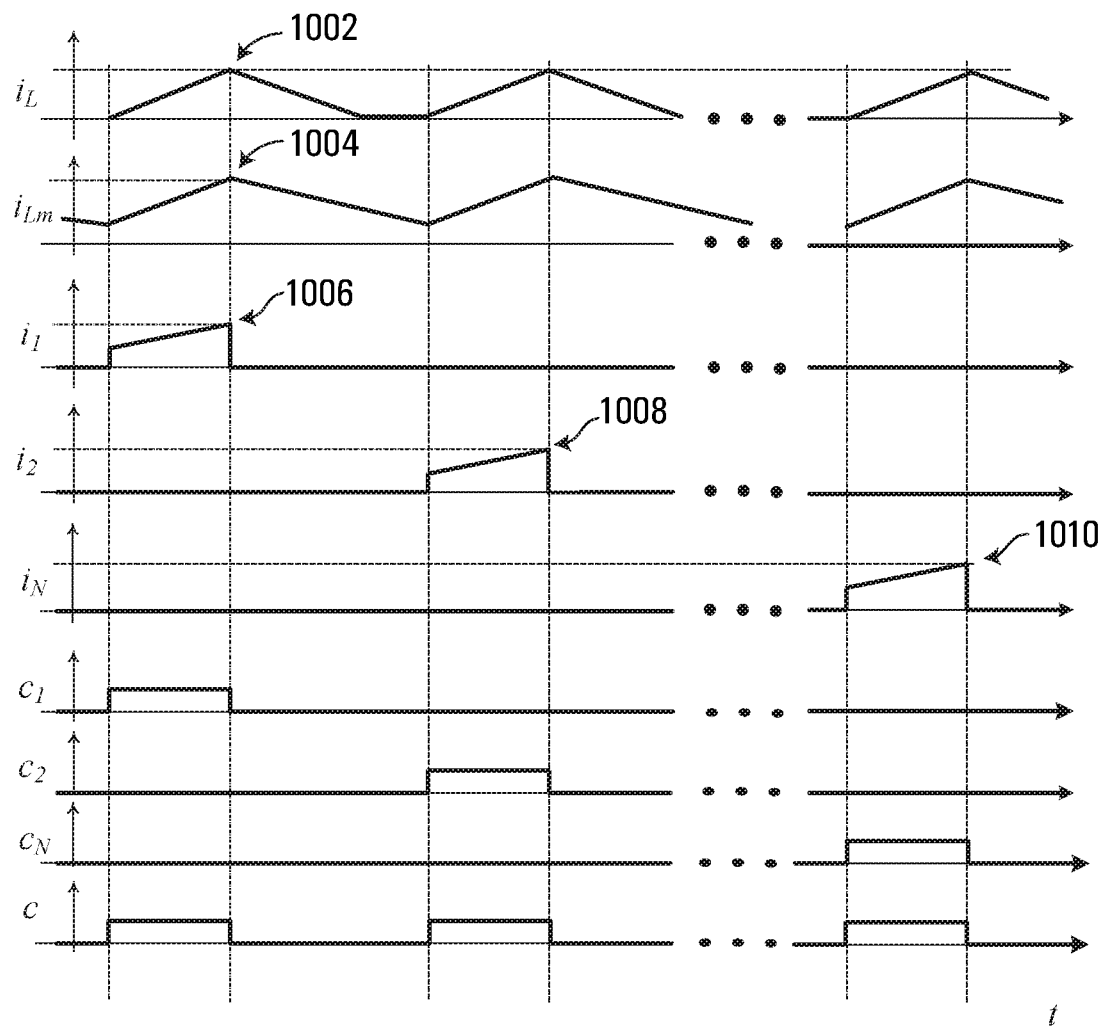
FIG. 10 illustrates switching signals for primary side switches and corresponding inductor current waveforms for a discontinuous conduction mode of operation, in accordance with some embodiments.
Figure 11:
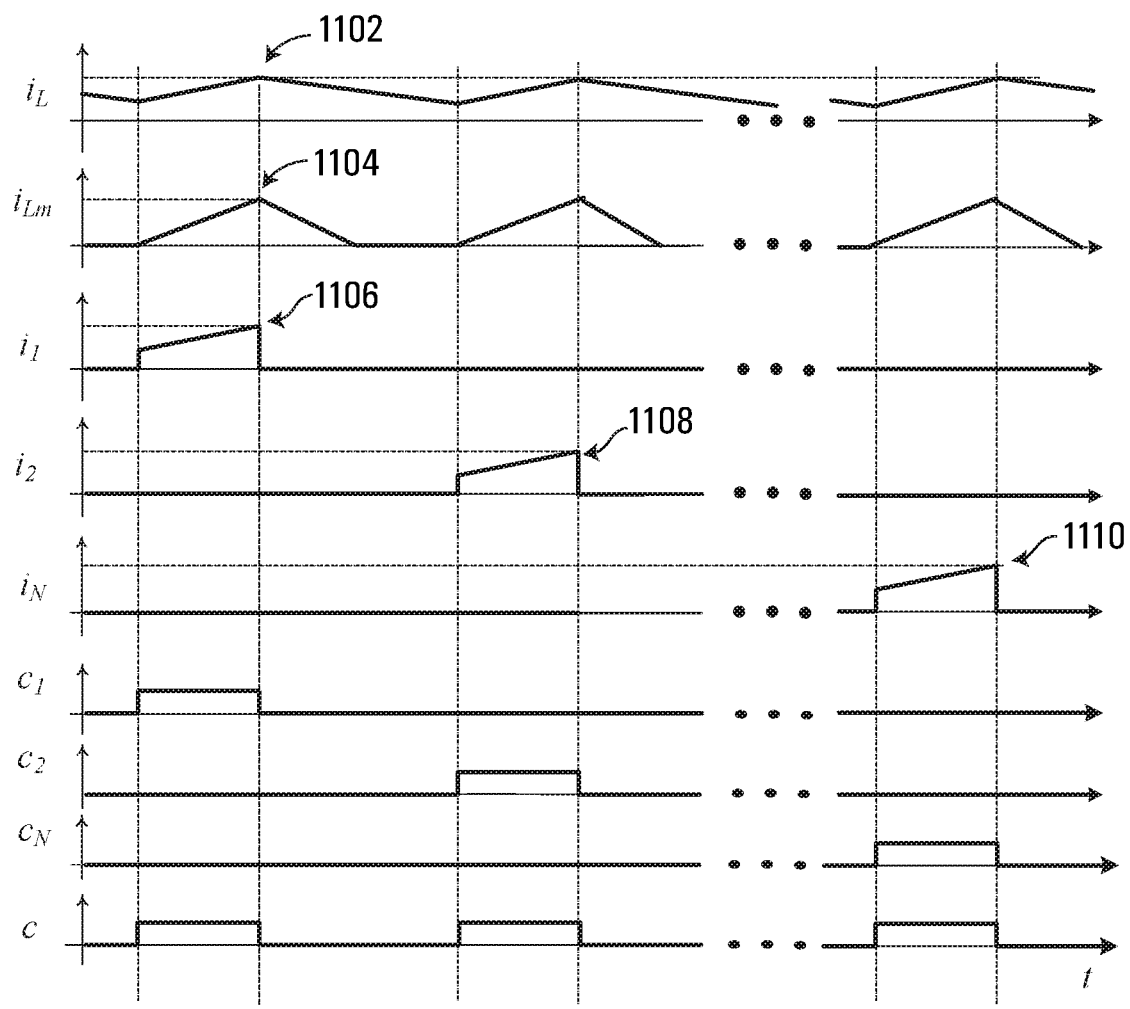
FIG. 11 illustrates switching signals for primary side switches and corresponding inductor current waveforms for a further discontinuous conduction mode of operation, in accordance with some embodiments.
Figure 12:
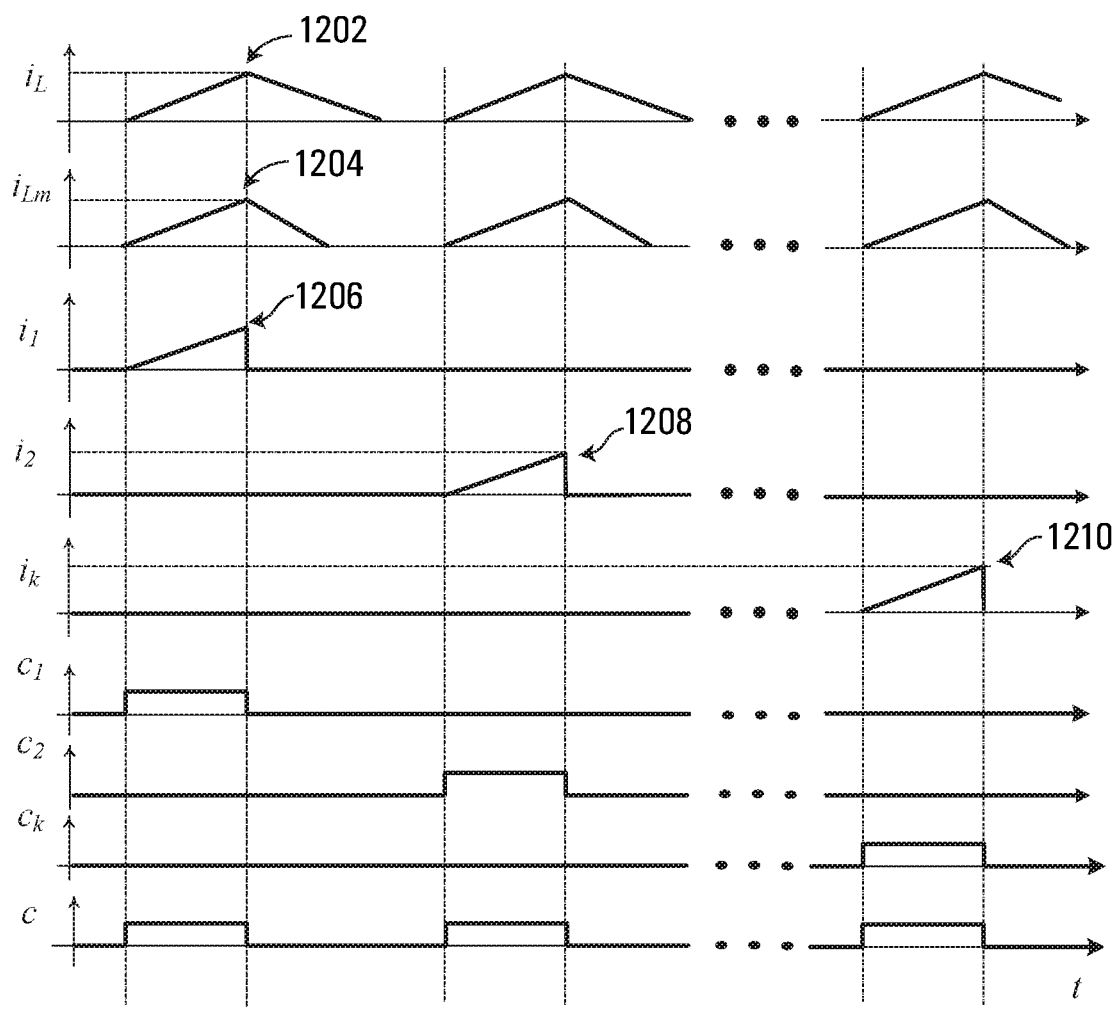
FIG. 12 illustrates switching signals for primary side switches and corresponding inductor current waveforms for a still further discontinuous conduction mode of operation, in accordance with some embodiments.

Switching waveforms represented in FIGS. 10, 11 and 12 depict various Discontinuous Conduction Modes (DCMs) of operation. The DCM of operation is a name for a mode wherein either one of the magnetizing current, $i_{Lm}$, or the output inductor current, $i_L$, is discontinuous. Similarly, a Boundary Conduction Mode (BCM) of operation may be achieved by operating either of the two magnetizing or output inductor currents at the boundary between the CCM of operation and the DCM of operation. A Quasi Resonant (QR) mode of operation may be achieved if the turn-on time of the primary side switching devices 160, 161 is delayed in the BCM of operation such that the switch is turned on at the instant where either the voltage across the magnetizing inductance 138 or the voltage across the output inductor 146 reaches a minimum after the respective current goes to zero.

FIG. 10 illustrates simplified example switching signals for primary side switching devices 160/161 and corresponding inductor current waveforms in response to control signals $c_1$ through $c_N$ generated by the controller circuit 170, in accordance with some embodiments where the series combination of the relaxation winding 136 and the relaxation diode 162 is connected across the terminals of the output capacitor 148. In FIG. 10, the current, $i_{Lm}$, through the magnetizing inductance 138 ramps up to an $i_{Lm}$ peak, $I_{Lmp}$, represented by reference numeral 1004. Furthermore, the current, $i_L$, through the output inductor 146 ramps up, as well, to an $i_L$ peak, $I_p$, represented by reference numeral 1002. $I_p$ 1002 represents a DCM operating mode for the output inductor 146 where the current $i_L$ must reach zero at every switching cycle during steady state operation. Furthermore, an $i_L$ peak 1006 for the current, $i_1$, through the first primary winding 132-1, an $i_2$ peak 1008 for the current, $i_2$, through the second primary winding 132-2 and an $i_N$ peak 1010 for the current, $i_N$, through the $N^{th}$ primary winding 132-N may be determined in the same manner as described hereinbefore with reference to the peaks in FIG. 9.

FIG. 11 illustrates simplified example switching signals for primary side switching devices 160 and corresponding inductor current waveforms in response to control signals $c_1$ through $c_N$ generated by the controller circuit 170, in accordance with some embodiments where the series combination of the relaxation winding 136 and the relaxation diode 162 is either connected across embodiments of the generic input voltage source 110 or connected across the terminals of the output capacitor 148. In FIG. 11, the current, $i_{Lm}$, through the magnetizing inductance 138 ramps up to an $i_{Lm}$ peak, $I_{Lmp}$, represented by reference numeral 1104. $I_{Lmp}$ 1104 represents a DCM operating mode for the magnetizing inductance $L_m$ 138 where current must reach zero at every switching cycle during steady state operation. Furthermore, the current, $i_L$, through the output inductor 146 ramps up, as well, to an $i_L$ peak, $I_p$, represented by reference numeral 1102. Furthermore, an $i_1$ peak 1106 for the current, $i_1$, through the first primary winding 132-1, an $i_2$ peak 1108 for the current, $i_2$, through the second primary winding 132-2 and an $i_N$ peak 1110 for the current, $i_N$, through the $N^{th}$ primary winding 132-N may be determined in the same manner as described hereinbefore with reference to the peaks in FIG. 9.

As shown in FIGS. 9-11, the magnetizing inductance 138 can be operated in DCM (discontinuous conduction mode), QR (quasi-resonant mode), BCM (boundary conduction mode), or CCM (continuous conduction mode). The choice of mode of operation depends on the application, input-to-output voltage ratio, load current and overall design optimization for the output power delivery division and sizing of i) a buck-based circuit formed by the secondary winding 134, the diodes 142, 144, and the output inductor 146, and ii) a buck-boost-based circuit formed by the relaxation winding 136 and the relaxation diode 162. This advantageous flexibility is contrary to how a conventional forward converter operates, whereby the magnetizing inductance of a transformer of the conventional forward converter has to be operated only in DCM mode to avoid core saturation of the transformer and to minimize conduction losses.

In a conventional forward converter, a converter primary side switching device is controlled similar to a buck converter with respect to a secondary side rectifier device, and an output voltage DC level of the conventional forward converter is controlled by duty cycle similar to a buck converter with additional multiplication factor of $$\frac{n_s}{n_p}$$

due to transformer turns ratio. Thus, the output DC voltage level of the conventional forward converter is governed by the equation:

$$v_{out} = \frac{Dn_s}{n_p},$$

where D is the duty cycle when operated in BCM or CCM mode. The buck-based power stage can be operated in DCM, BCM or CCM mode, but with a limitation on the duty cycle. However, in order to avoid core saturation of the transformer, a magnetizing inductance of a transformer of the conventional forward converter must be guaranteed by design to operate only in DCM mode, resulting in a limitation on duty cycle of the conventional forward converter (as seen by the output inductor of the forward converter) to be smaller than $$\frac{n_{p,i}}{n_{p,i} + n_r}.$$

That is, the buck-based circuit refers to the circuit components that perform power transfer through the output inductor 146. The output inductor 146 can be operated in DCM, BCM, or CCM modes. The buck-boost-based circuit refers to the circuit that performs power transfer through the magnetizing inductance $L_m$ 138. In the case of conventional forward converter, the magnetizing inductance $L_m$ has to be operated in DCM mode (i.e., the current through the magnetizing inductance $L_m$ must go to zero at every cycle).

In some embodiments of forward converters disclosed herein, the principle of operation and therefore control mechanism is different from that of a conventional forward converter as described below. That is, forward converters disclosed herein which have a relaxation winding on the secondary side (e.g., the forward converters 200, 400, 600, 800, 1600, 1900, 2100, 2300) have a multi-level, series connection, primary-side stage which is formed by the primary side switching devices 160/161 and primary side windings 132. This primary-side stage is shared and simultaneously used by two parallel circuits that deliver power to the load, the parallel circuits being i) the buck-based circuit formed by the secondary winding 134, the diodes 142, 144, and the output inductor 146, and ii) the buck-boost-based circuit formed by the relaxation winding 136 and the relaxation diode 162. Thus, such forward converters can be said to have a serial input, parallel output topology. As previously explained, the controller circuit 170 can be configured to operate each of the parallel outputs in CCM, BCM, or DCM. The buck-boost based circuit formed by the relaxation winding 136 and the relaxation diode 162 can operate in QR mode as well to reduce switching losses for the primary side switching devices 160/161 at its turn-on transition and therefore minimize switching losses. The series connected input allows for reduced semiconductor voltage ratings, reduced switching frequency for each primary side device, distribution of heat across multiple devices and transformer size reduction as described in this disclosure.

When the buck-based output (output inductor 146 current $i_L$) is operated in BCM or DCM mode, the output voltage DC is controlled and governed by the equation:

$$v_{out} = v_{in}\frac{Dn_s}{Nn_{p,i}},$$

where D is the duty cycle seen by the output inductor 146. When the magnetizing inductance 138 is operated in BCM or CCM, the output voltage $v_{out}$ DC level is controlled and governed by the equation:

$$v_{out} = v_{in}\frac{Dn_r}{ND'n_{p,i}},$$

where D is the duty cycle seen by the magnetizing inductance 138 and D' is a primary side switching device off-time duty cycle, equal to 1−D. Therefore, by designing the transformer winding ratios for a given $V_{in}$ and $V_{out}$, each or both of the two inductors 138, 146 can be pushed into CCM to deliver higher load current as shown in FIGS. 9-11. This choice depends on the design of the transformer 130, the output inductor 146 and the selection of the diodes 142, 144, 162 and primary side switching devices 160/161 to achieve maximum efficiency and minimized volume for a specific application with given load current and input and output voltages. The determining factor for mode of operation is $$\frac{n_r}{n_s D'}, \text{ where } \frac{n_r}{n_s D'} < 1$$

results in the output inductor 146 (buck-based output) being pushed to CCM before the magnetizing inductance 138 (buck-boost-based output), where the magnetizing inductance 138 is operated in DCM during steady-state operation and vice versa for the case $$\frac{n_r}{n_s D'} > 1.$$

Therefore, having the known $n_r$, $n_s$ and duty cycle, the controller circuit 170 selects the mode of operation to maximize efficiency, and in order to optimize the dynamic performance, the controller circuit 170 can switch between different dynamic models at the time of mode switching.

For operating the magnetizing inductance 138 in DCM mode of operation, the criteria for the described embodiment herein is $$D < \frac{N n_{p,i} v_{out}}{n_r v_{in} + N n_{p,i} v_{out}}$$

whereas for a conventional forward converter, $$D \text{ is} < \frac{n_{p,i}}{n_{p,i} + n_r}.$$

However, as explained, DCM operation for the magnetizing inductance 138 is not required for the embodiments of forward converter disclosed herein as opposed to conventional forward converters.

FIG. 12 illustrates simplified example switching signals for primary side switching devices 160/161 and corresponding inductor current waveforms in response to control signals $c_1$ through $c_N$ generated by the controller circuit 170, in accordance with some embodiments where the series combination of the relaxation winding 136 and the relaxation diode 162 is either connected across embodiments of the generic input voltage source 110 or connected across the terminals of the output capacitor 148. In FIG. 12, the current, $i_{Lm}$, through the magnetizing inductance 138 ramps up to an $i_{Lm}$ peak, $I_{Lmp}$, represented by reference numeral 1204. $I_{Lmp}$ 1204 corresponds to a DCM operating mode for the magnetizing inductance $L_m$ 138 where current must reach zero at every switching cycle during steady state operation. Furthermore, the current, $i_L$, through the output inductor 146 ramps up, as well, to an $i_L$ peak, $I_p$, represented by reference numeral 1202. Furthermore, an $i_1$ peak 1206 for the current, $i_1$, through the first primary winding 132-1, an $i_2$ peak 1208 for the current, $i_2$, through the second primary winding 132-2 and an $i_N$ peak 1210 for the current, $i_N$, through the $N^{th}$ primary winding 132-N may be determined in the same manner as described hereinbefore with reference to the peaks in FIG. 9.

Figure 13:
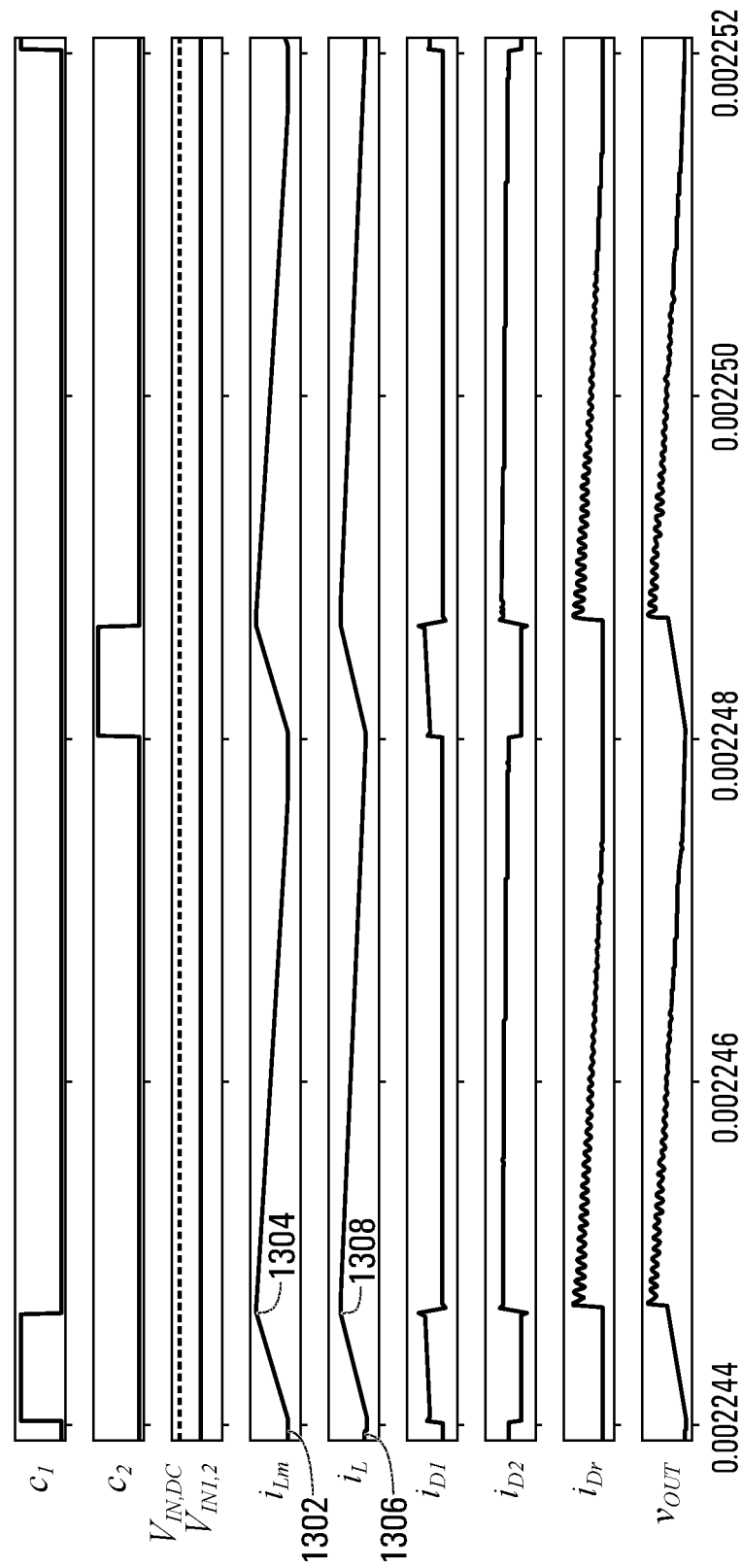
FIG. 13 illustrates simulation results from use of the forward converter in the circuit of FIG. 6, in accordance with some embodiments.

FIG. 13 illustrates plots representative of example simulation results of use of the forward converter 600 of FIG. 6, in accordance with some embodiments, where two primary windings are used (N=2) with the following parameters: $V_{ds}$=400; V; $v_{out}$=20 V; $I_{load}$=8 A; $L_m$=60 µH; $L_d$=33 µH; $n_{p;1}$=6; $n_{p;2}$=6; $n_s$=5; $n_r$=3. The first two waveforms of FIG. 13 show the control (gate driving) signals $c_1$ and $c_2$ of the primary side switching devices 160-1 and 160-2 when the forward converter 600 operates in accordance with the waveforms shown in FIG. 11 (i.e., the output inductor 146 (of the buck-based power stage) is operated in CCM mode and the magnetizing inductance $L_m$ 138 (of the buck-boost based power stage) is operated in DCM mode). The first diode 142 conducts current $i_L$ of the output inductor 146 when one of the primary side switching devices 160 is enabled. When all of the primary side switching devices 160 are disabled, the current $i_L$ goes through the second diode 144. In FIG. 13, the magnetizing inductance $L_m$ 138 is operated in DCM mode. When one of the primary side switching devices 160 is enabled, the magnetizing inductance $L_m$ 138 is charged. When all of the primary side switching devices 160 are disabled, the current $i_{LM}$ conducts through the relaxation winding 136 and the relaxation diode $D_r$ 162 until the magnetizing inductance $L_m$ 138 is fully discharged.

A third waveform of FIG. 13 shows the voltage, $V_{IN}$, of the DC input voltage source 180 and the voltages, $V_{in;1}$ and $V_{in;2}$, of the input capacitors 122-1, 122-2. It can be seen that when two primary windings are used, the voltage of the two input capacitors 122-1, 122-2 is equal to the half of the input voltage.

A fourth waveform of FIG. 13 shows the current, $i_{Lm}$, of the magnetizing inductance 138. Notably, as depicted in FIG. 13, this current is discontinuous. Indeed, the current, $i_{Lm}$, of the magnetizing inductance 138 is illustrated as ranging from a baseline 1302 of 0 A to an $i_{Lm}$ peak 1304 of 1.5 A.

A fifth waveform of FIG. 13 shows the current, $i_L$, of the output inductor 146. Notably, as depicted in FIG. 13, this current is continuous. Indeed, the current, $i_L$, of the output inductor 146 is illustrated as ranging from a baseline 1306 of 6 A to an $i_L$ peak 1308 of 9 A. Thus, the simulation waveforms of FIG. 13 represent the discontinuous conduction mode of FIG. 11, where only one of the inductor currents is discontinuous. A sixth and seventh waveform of FIG. 13 show currents $i_{D1}$ and $i_{D2}$, which represent respective currents of the first diode 142 and the second diode 144. An eight waveform of FIG. 13 shows current $i_{Dr}$, which represents a current through the relaxation diode $D_r$ 162. A ninth waveform of FIG. 13 shows $V_{out}$.

Figure 14:
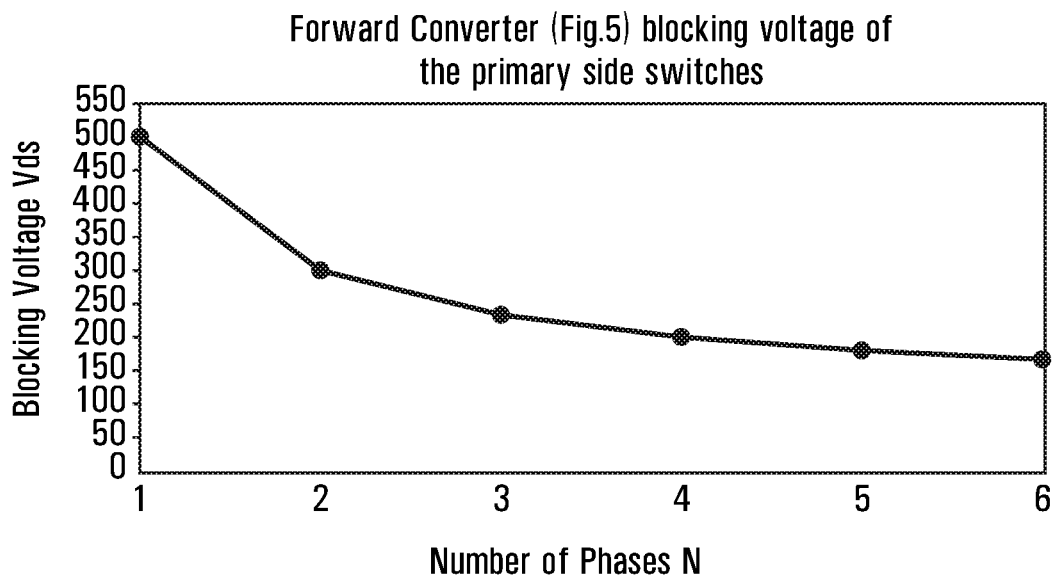
FIG. 14 illustrates a reduction of blocking voltage as a function of a number of primary windings of a transformer for the merged voltage-divider forward converter of FIG. 5, in accordance with some embodiments.

FIG. 14 is a graph with an exemplary curve showing blocking voltage of the primary side switching devices 160 as a function of the number, N, of primary windings 132, in accordance with some embodiments. With reference to FIG. 14, it can be seen that the blocking voltage of the switches reduces as N, the number of primary windings 132, increases. The graph illustrated in FIG. 14 has been computed based on a scenario wherein the forward converter 500 of FIG. 5 is used for a step-down conversion ratio with the following parameters: $V_{IN}$=400 V; $V_{out}$=20 V; and $$\frac{n_{p;k}}{n_r} = \frac{1}{4}.$$

In the circuit illustrated in FIG. 5, a blocking voltage, $V_{ds;k}$, of the primary side switching device 160-$k$ is given with the equation:

$$V_{ds;k} = \frac{V_{IN}}{N} + V_{IN} \frac{n_{p;k}}{n_r}. \quad (1)$$

In equation (1), $V_{IN}$ is the voltage of the DC input voltage source 180, N is the number of primary windings 132, i.e., the number of input capacitors 122, $n_{p;k}$ represents the number of turns of the $k^{th}$ primary winding 132-$k$ (in one aspect of the present application, this value is equal for all primary windings, that is, $n_{p;1}=n_{p;2}=\ldots=n_{p;N}$), $n_r$ represents the number of turns of the relaxation winding 136.

Figure 15:
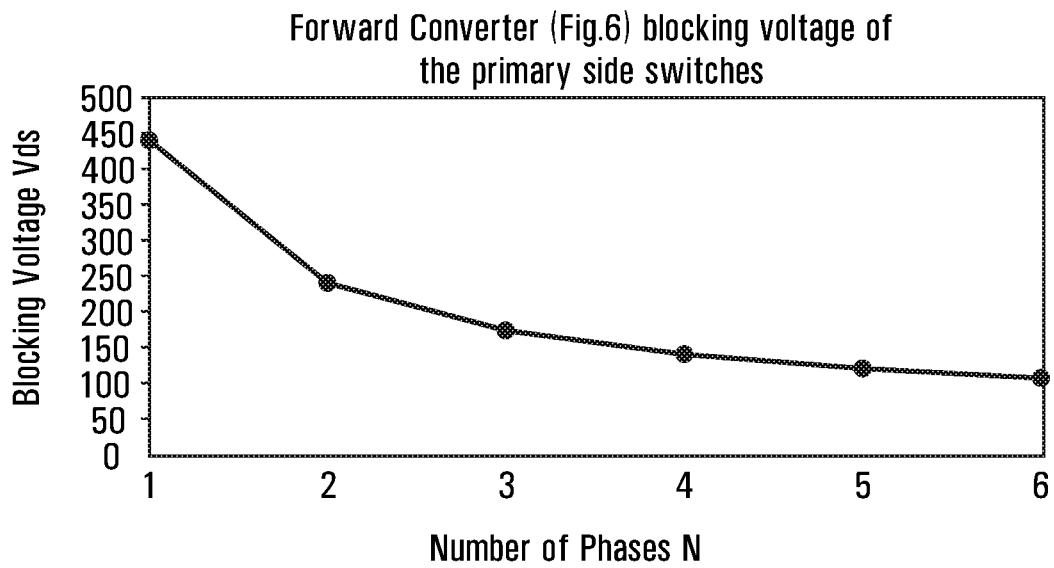
FIG. 15 illustrates a reduction of a blocking voltage as a function of a number of primary windings of a transformer for the merged voltage-divider forward converter of FIG. 6, in accordance with some embodiments.

FIG. 15 is a graph with an exemplary curve showing blocking voltage of the primary side switches as a function of the number, N, of primary windings 132, in accordance with some embodiments. With reference to FIG. 15, it can be seen that the blocking voltage of the switches reduces as N, the number of primary windings 132, increases. The graph illustrated in FIG. 15 has been computed based on a scenario wherein the forward converter 600 of FIG. 6 is used for a step-down conversion ratio with the following parameters: $V_{IN}$=400 V; $V_{IN}$=20 V; and $$\frac{n_{p;k}}{n_r}=2.$$

In the circuit illustrated in FIG. 6, a blocking voltage, $V_{ds;k}$, of the primary side switching devices 160 is given with the equation:

$$V_{ds;k} = \frac{V_{IN}}{N} + V_{out}\frac{n_{p;k}}{n_r}. \qquad (2)$$

In equation (2), $V_{out}$ is the value of the output voltage.

Figure 16:
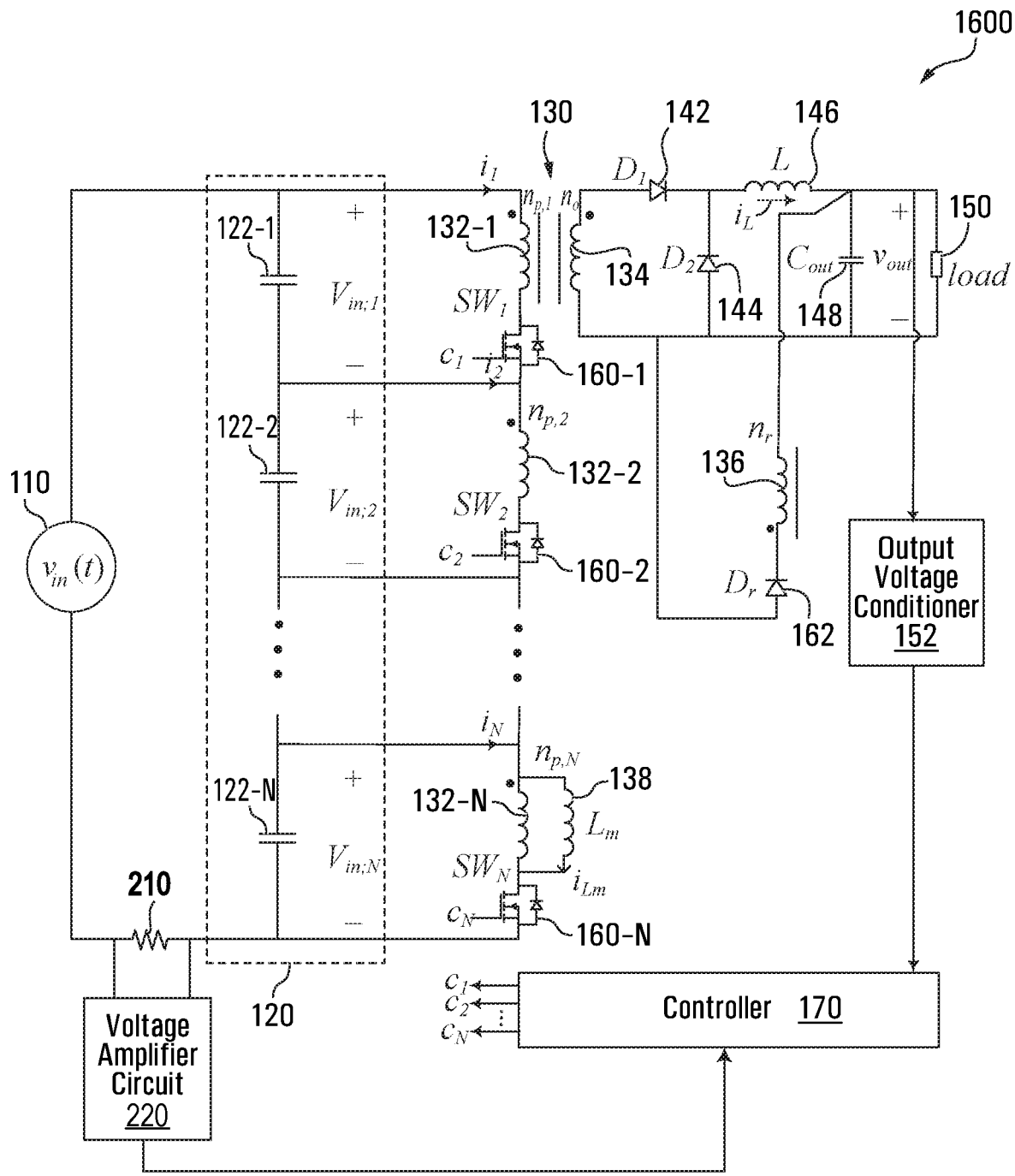
FIG. 16 schematically illustrates the merged voltage-divider forward converter of FIG. 2 with an additional implementation of a current sensing circuit that provides current measurement representative of current through all primary side switches and where a relaxation winding is connected across the output voltage, in accordance with some embodiments.

FIG. 16 illustrates a forward converter 1600 which is similar to the forward converter 200 of FIG. 2, in accordance with some embodiments. That is, the forward converter 1600 includes the generic input voltage source 110, the capacitive divider 120 with capacitive devices 122, the transformer 130 with primary windings 132 and secondary winding 134, the primary side switching devices 160, the diodes 142, 144, the output inductor 146, the output capacitor 148, the output load 150, the output voltage conditioner 152, the controller circuit 170, the relaxation winding 136 and the relaxation diode 162. Additionally, the forward converter 1600 includes a current-sensing resistor 210 connected between the generic input voltage source 110 and the capacitive divider 120. A voltage amplifier circuit 220 is configured to measure a voltage difference across the current-sensing resistor 210 and to provide an indication of the current to the controller circuit 170. The indication of the current provided to the controller circuit 170 may be considered representative of current through any of the primary side switching devices 160. Advantageously, even though a single current-sensing resistor 210 is used, current through any of the primary side switching devices 160 may be measured. Thus, in accordance with the disclosed approach, one current-sensing resistor per primary side switching device 160 is not needed. Additionally, current associated with a body diode current of a primary side switching device 160 is also detected through the current-sensing resistor 210.

The controller circuit 170 may base control (through control signal $c_1, c_2, \ldots, c_N$) of the primary side switching devices 160/161 on receipt, from the output voltage conditioner 152, of a conditioned indication of a voltage across the output capacitor 148 and receipt, from the voltage amplifier circuit 220, of an indication of the current measured through the current-sensing resistor 210.

Figure 17:
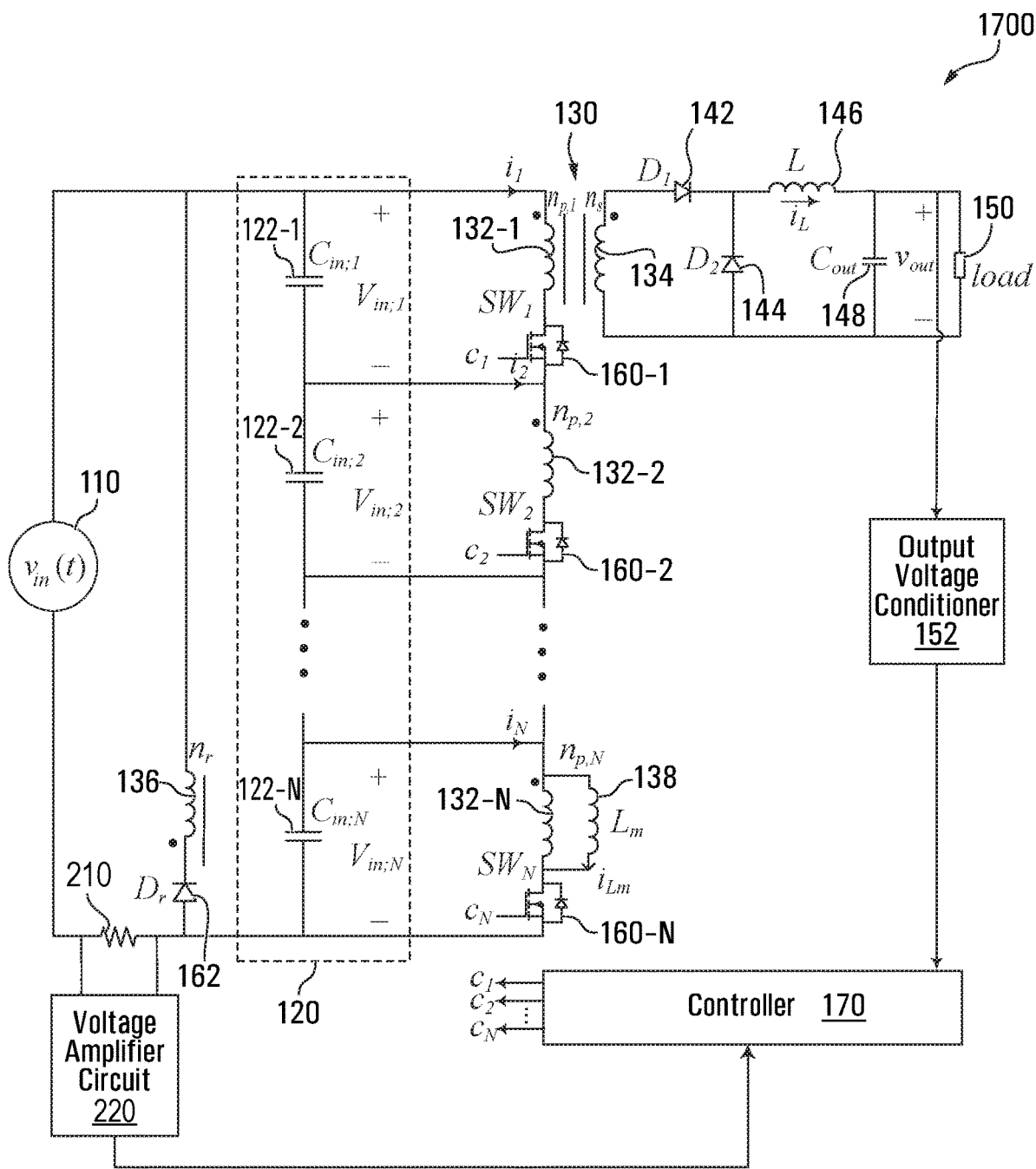
FIG. 17 schematically illustrates the merged voltage-divider forward converter of FIG. 1 with an additional implementation of a current sensing circuit that provides current measurement representative of current through all primary switches and through a relaxation winding, where the relaxation winding is connected across a generic input voltage source, in accordance with some embodiments.

FIG. 17 illustrates a forward converter 1700 which is similar to the forward converter 100 of FIG. 1, in accordance with some embodiments. That is, the forward converter 1700 includes the generic input voltage source 110, the capacitive divider 120 with capacitive devices 122, the transformer 130 with primary windings 132 and secondary winding 134, the primary side switching devices 160, the diodes 142, 144, the output inductor 146, the output capacitor 148, the output load 150, the output voltage conditioner 152, the controller circuit 170, the relaxation winding 136 and the relaxation diode 162. Additionally, the forward converter 1700 includes a current sensing device, with its implementation shown here with the current-sensing resistor 210, similar to that of FIG. 16, connected between the generic input voltage source 110 and the capacitive divider 120. The voltage amplifier circuit 220 is arranged to measure a voltage difference across the current-sensing resistor 210 and provide an indication of the current to the controller circuit 170. The indication of the current provided to the controller circuit 170 may be considered representative of current through any of the primary side switching devices 160 and the current through the relaxation winding 136. The controller circuit 170 may base control (through control signal $c_1, c_2, \ldots, c_N$) of the primary side switching devices 160/161 on receipt, from the output voltage conditioner 152, of a conditioned indication of a voltage across the output capacitor 148 and receipt, from the voltage amplifier circuit 220, of an indication of the current measured through the current-sensing resistor 210.

Forward converters illustrated in FIGS. 18-23 include a voltage snubbing circuit associated with a corresponding primary winding, in accordance with some embodiments. Conveniently, the voltage snubbing circuit may be adapted to reduce a voltage overshoot across the corresponding primary side switching device and discharge a transformer leakage inductance.

Figure 18:
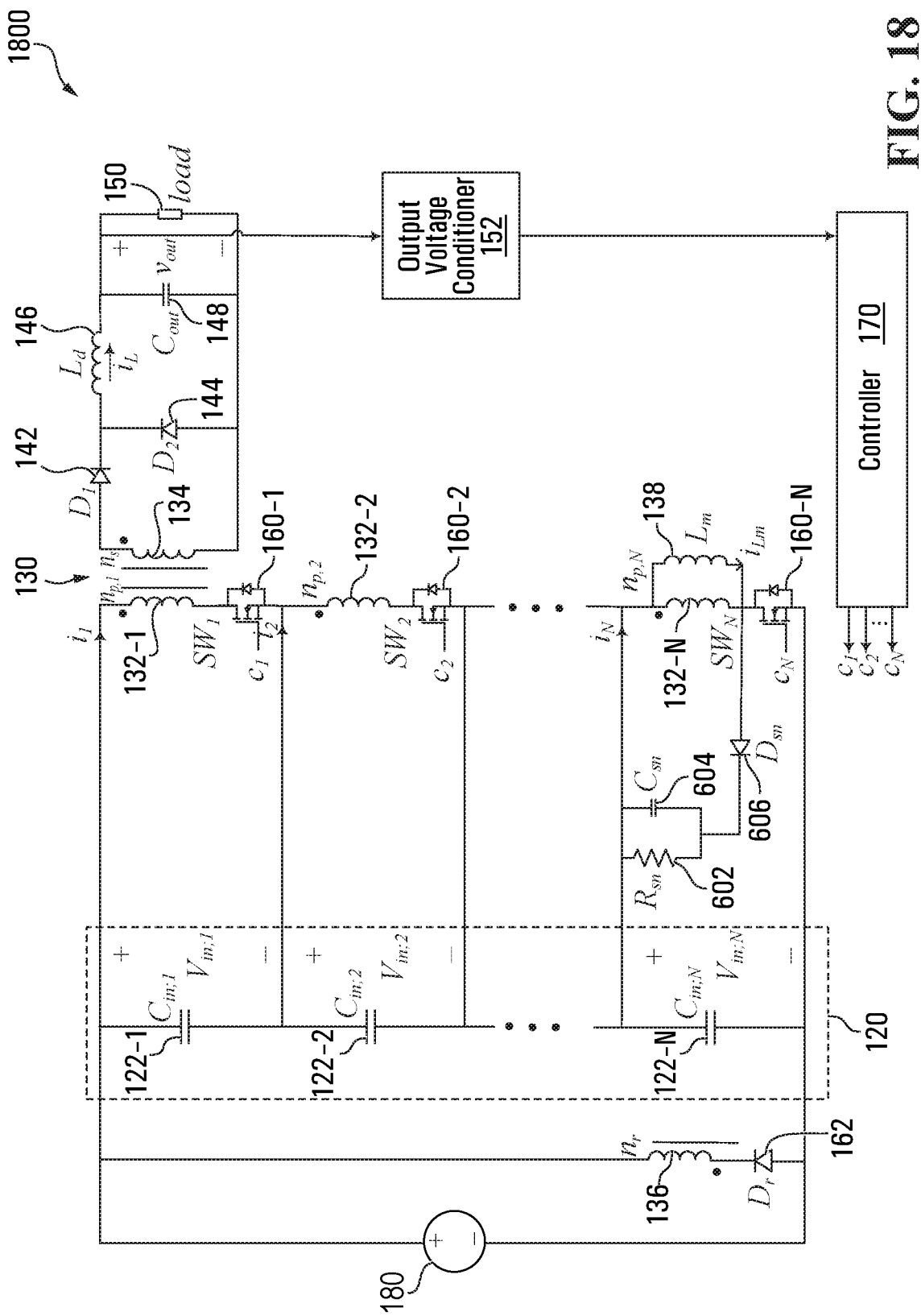
FIG. 18 schematically illustrates the merged voltage-divider forward converter of FIG. 5 with an additional implementation of a snubber circuit including a snubber resistor, a snubber diode and a snubber capacitor, in accordance with some embodiments.

FIG. 18 illustrates a forward converter 1800 similar to the forward converter 500 of FIG. 5, in accordance with some embodiments. That is, the forward converter 1800 includes the DC input voltage source 180, the capacitive divider 120 with capacitive devices 122, the transformer 130 with primary windings 132 and secondary winding 134, the diodes 142, 144, the primary side switching devices 160, the output inductor 146, the output capacitor 148, the output load 150, the output voltage conditioner 152, the controller circuit 170, the relaxation winding 136 and the relaxation diode 162. Additionally, the forward converter 1800 includes a passive snubber circuit connected across the $N^{th}$ primary winding 132-N. The passive snubber circuit includes a snubber diode 606 ($D_{sn}$) in series with a parallel combination of a snubber capacitor 604 ($C_{sn}$) and a snubber resistor 602 ($R_{sn}$).

Figure 19:
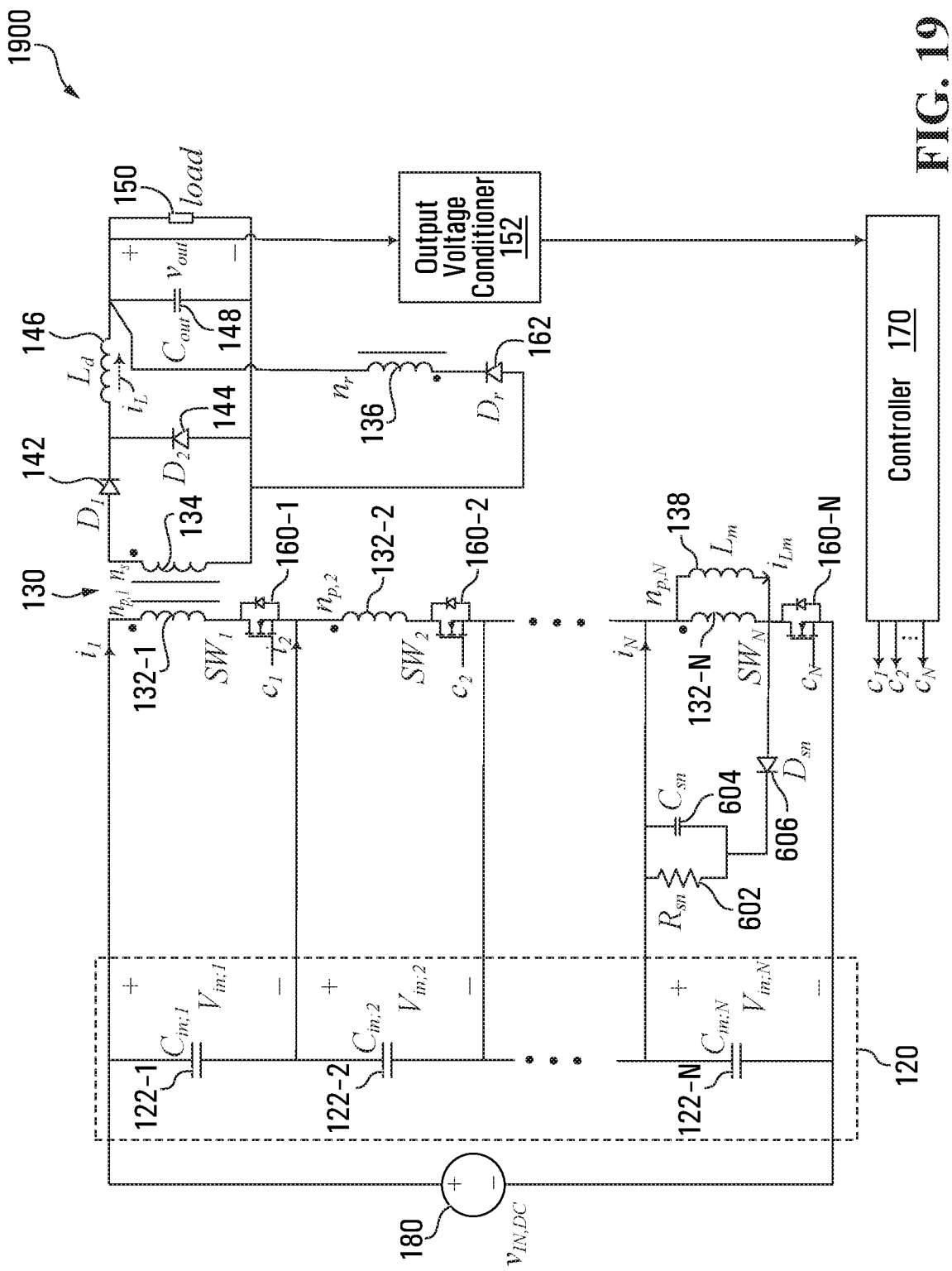
FIG. 19 schematically illustrates the merged voltage-divider forward converter of FIG. 6 with an additional implementation of a snubber circuit including a snubber resistor, a snubber diode and a snubber capacitor, in accordance with some embodiments.

FIG. 19 illustrates a forward converter 1900 similar to the forward converter 600 of FIG. 6, in accordance with some embodiments. That is, the forward converter 1900 includes the DC input voltage source 180, the capacitive divider 120 with capacitive devices 122, the transformer 130 with primary windings 132 and secondary winding 134, the diodes 142, 144, the primary side switching devices 160, the output inductor 146, the output capacitor 148, the output load 150, the output voltage conditioner 152, the controller circuit 170, the relaxation winding 136 and the relaxation diode 162. Additionally, the forward converter 1900 includes the passive snubber circuit, familiar from FIG. 18, connected across the $N^{th}$ primary winding 132-N.

Figure 20:
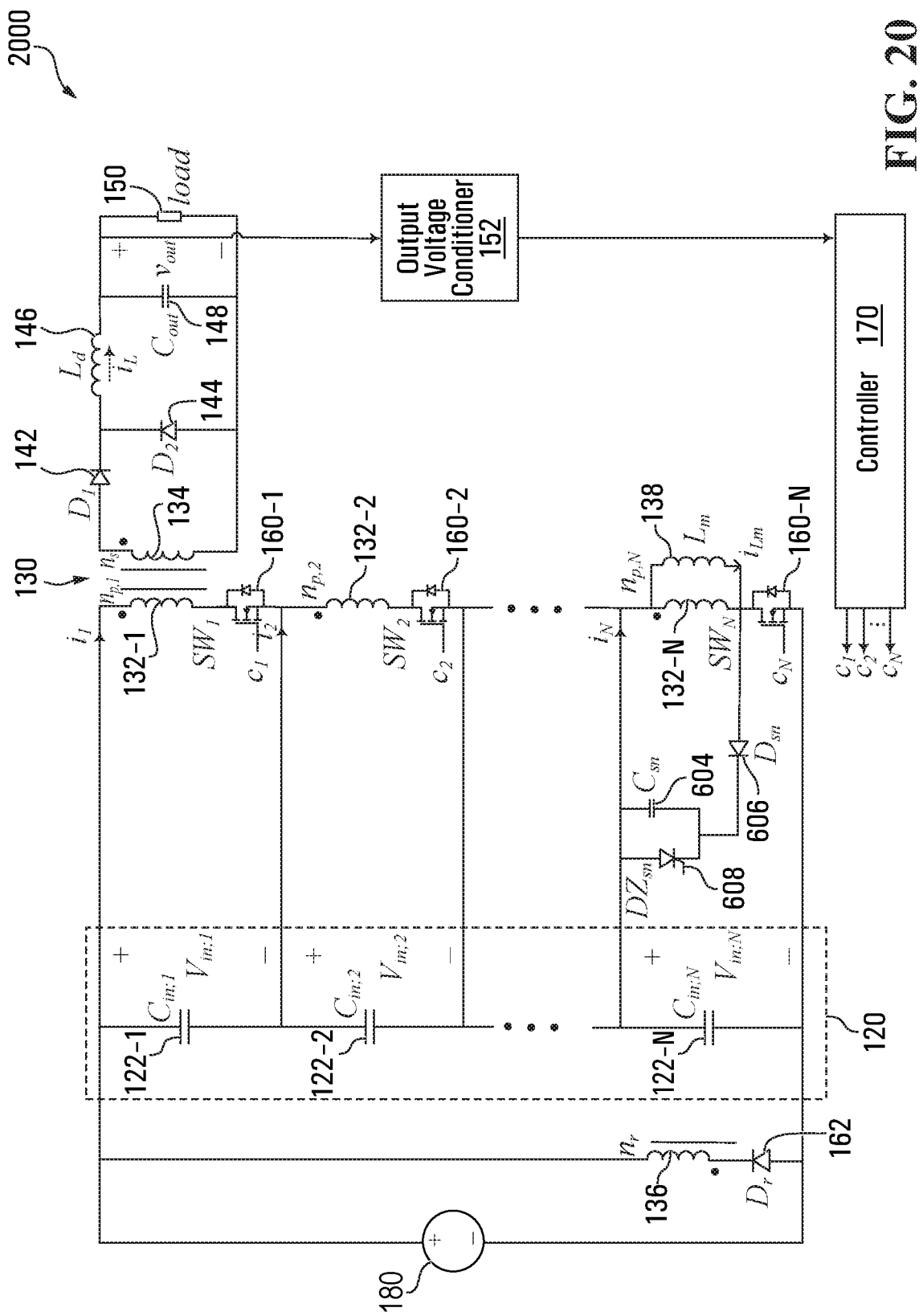
FIG. 20 schematically illustrates the merged voltage-divider forward converter of FIG. 5 with an additional implementation of a snubber circuit including a snubber diode, a snubber Zener diode and a snubber capacitor, in accordance with some embodiments.

FIG. 20 illustrates a forward converter 2000 similar to the forward converter 500 of FIG. 5, in accordance with some embodiments. That is, the forward converter 2000 includes the DC input voltage source 180, the capacitive divider 120 with capacitive devices 122, the transformer 130 with primary windings 132 and secondary winding 134, the primary side switching devices 160, the diodes 142, 144, the output inductor 146, the output capacitor 148, the output load 150, the output voltage conditioner 152, the controller circuit 170, the relaxation winding 136 and the relaxation diode 162. Additionally, the forward converter 2000 includes a passive snubber circuit connected across the $N^{th}$ primary winding 132-N. The passive snubber circuit includes the snubber diode 606 in series with a parallel combination of the snubber capacitor 604 and a snubber Zener diode 608 ($DZ_{sn}$).

Figure 21:
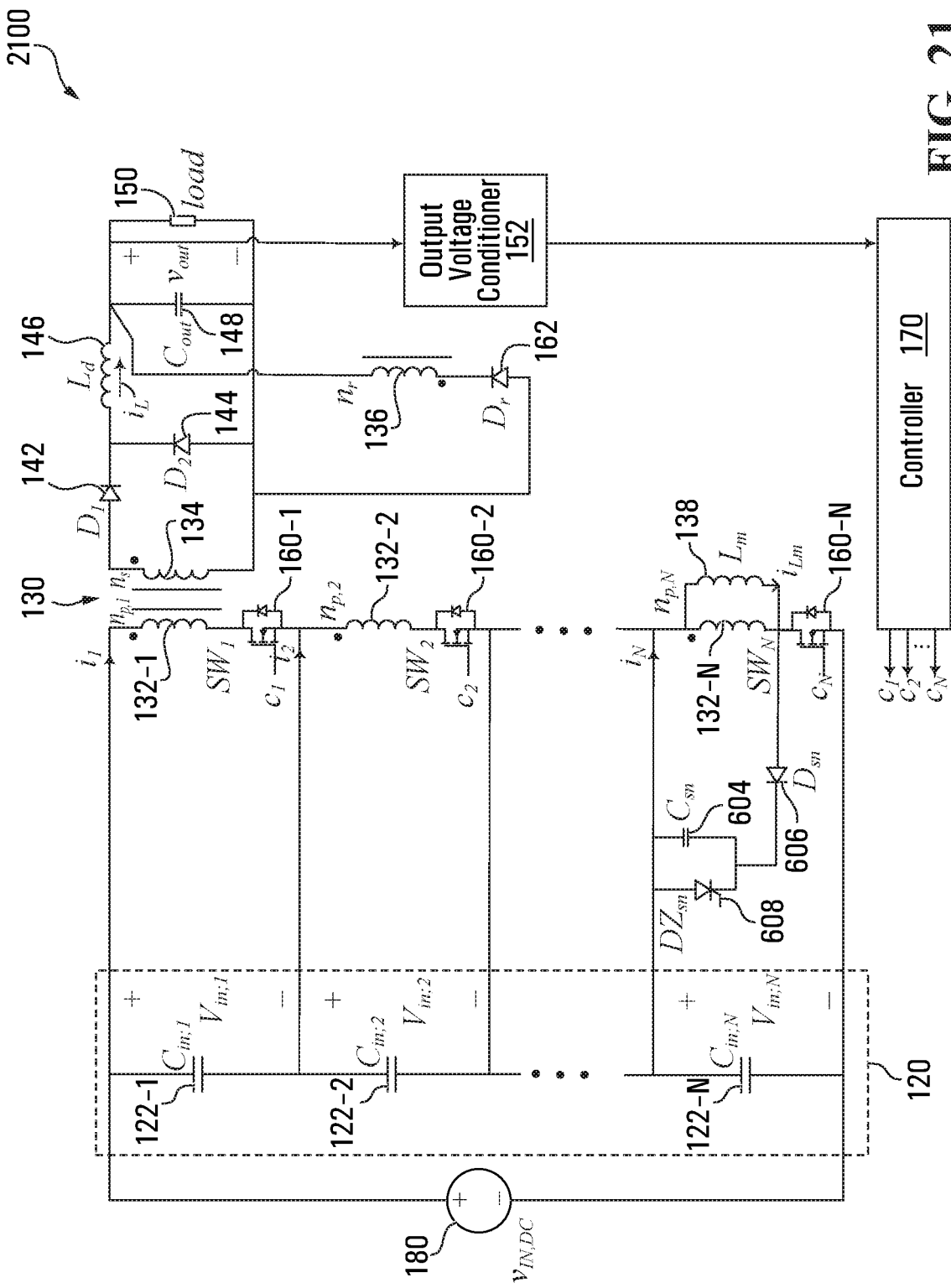
FIG. 21 schematically illustrates the merged voltage-divider forward converter of FIG. 6 with an additional implementation of a snubber circuit including a snubber diode, a snubber Zener diode and a snubber capacitor, in accordance with some embodiments.

FIG. 21 illustrates a forward converter 2100 similar to the forward converter 600 of FIG. 6, in accordance with some embodiments. That is, the forward converter 2100 includes the DC input voltage source 180, the capacitive divider 120 with capacitive devices 122, the transformer 130 with primary windings 132 and secondary winding 134, the primary side switching devices 160, the diodes 142, 144, the output inductor 146, the output capacitor 148, the output load 150, the output voltage conditioner 152, the controller circuit 170, the relaxation winding 136 and the relaxation diode 162. Additionally, the forward converter 2100 includes the passive snubber circuit, familiar from FIG. 20, connected across the $N^{th}$ primary winding 132-N.

Figure 22:
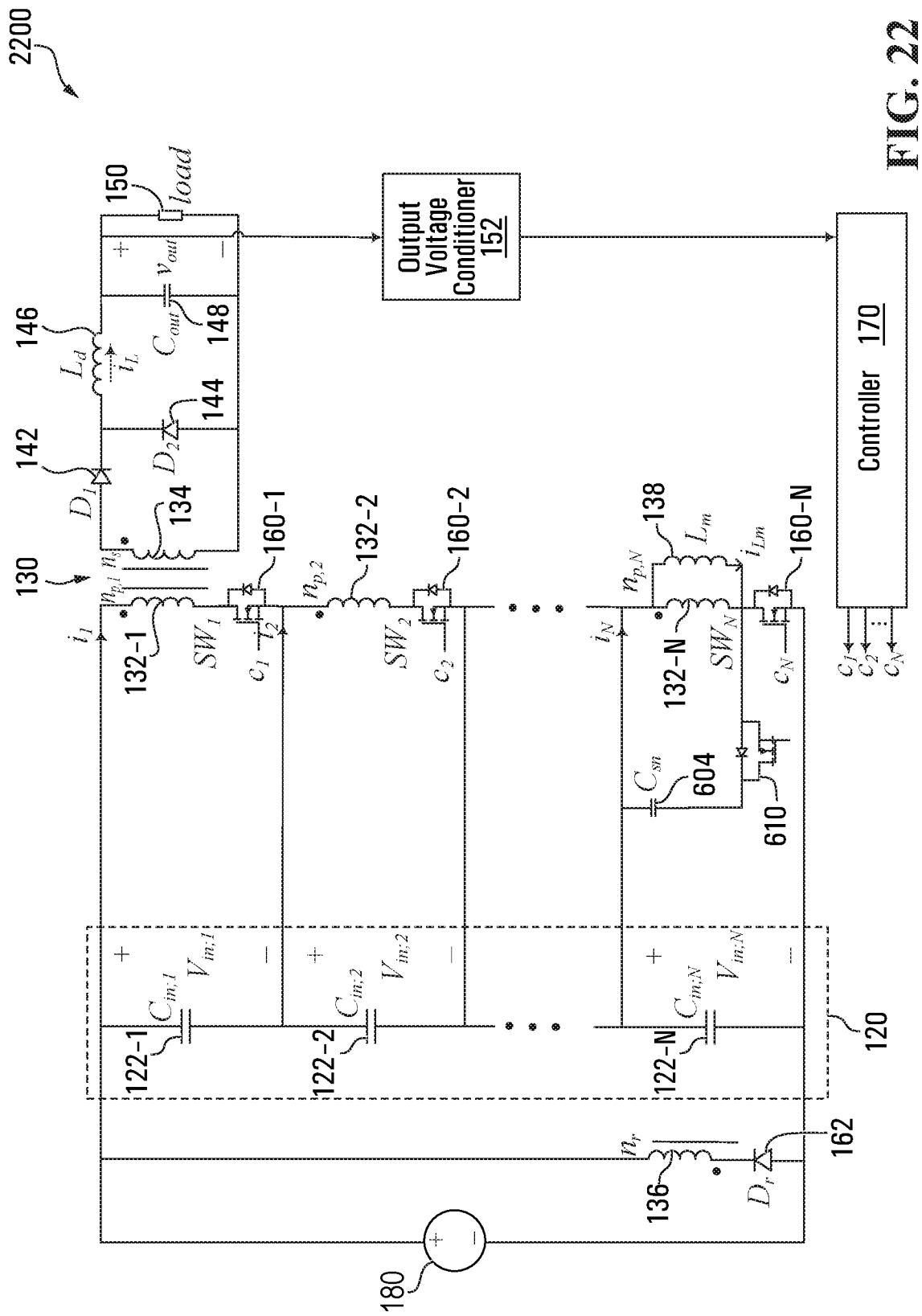
FIG. 22 schematically illustrates the merged voltage-divider forward converter of FIG. 5 with an additional implementation of an active snubber circuit including an active snubber switch and a snubber capacitor, in accordance with some embodiments.

FIG. 22 illustrates a forward converter 2200 similar to the forward converter 500 of FIG. 5, in accordance with some embodiments. That is, the forward converter 2200 includes the generic input voltage source 180, the capacitive divider 120 with capacitive devices 122, the transformer 130 with primary windings 132 and secondary winding 134, the primary side switching devices 160, the diodes 142, 144, the output inductor 146, the output capacitor 148, the output load 150, the output voltage conditioner 152, the controller circuit 170, the relaxation winding 136 and the relaxation diode 162. Additionally, the forward converter 2200 includes an active snubber circuit connected across the $N^{th}$ primary winding 132-N. The active snubber circuit includes a series combination of the snubber capacitor 604 and an active snubber switch 610.

Figure 23:
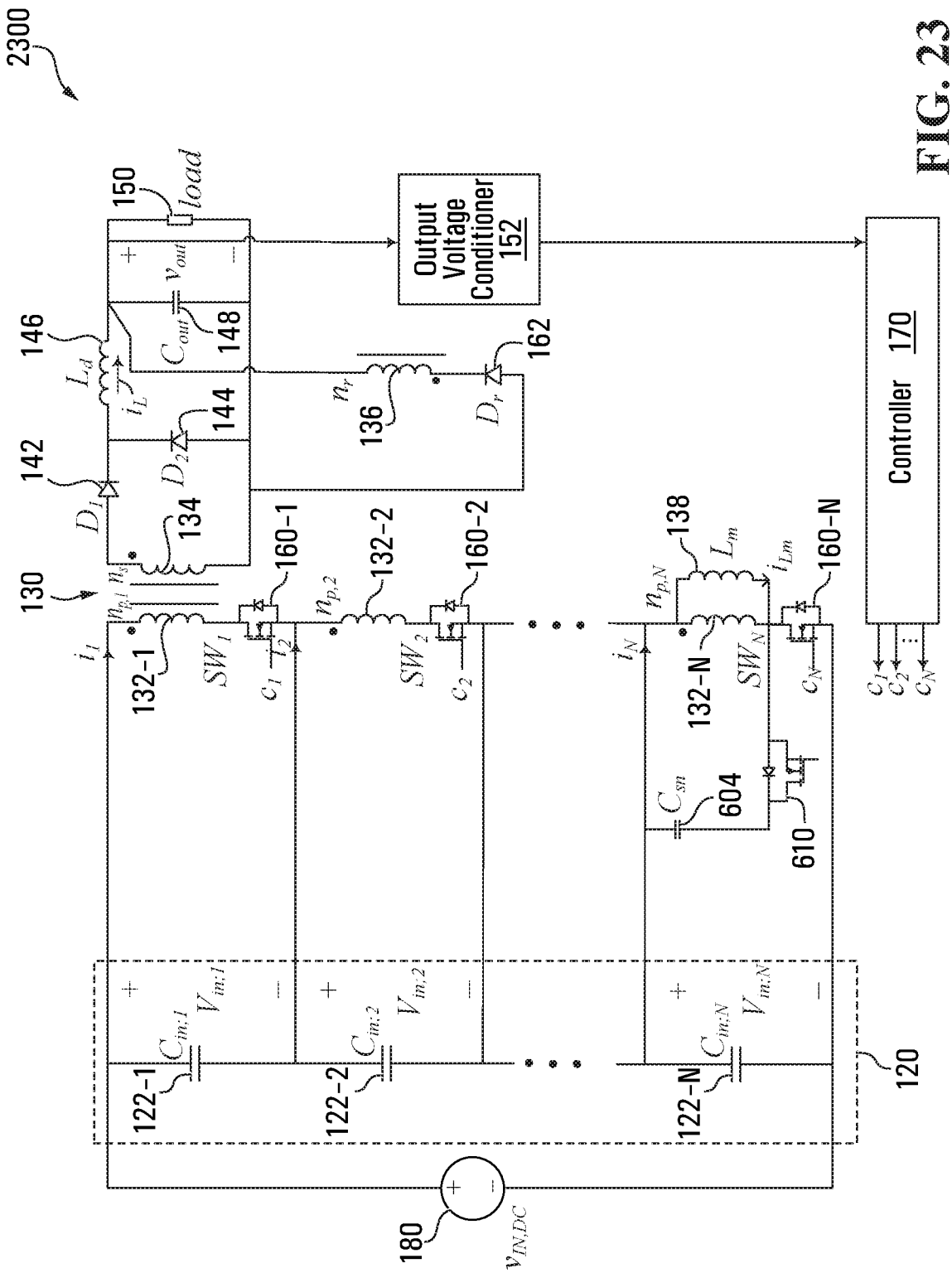
FIG. 23 schematically illustrates the merged voltage-divider forward converter of FIG. 6 with an additional implementation of an active snubber circuit including an active snubber switch and a snubber capacitor, in accordance with some embodiments.

FIG. 23 illustrates a forward converter 2300 similar to the forward converter 600 of FIG. 6, in accordance with some embodiments. That is, the forward converter 2100 includes the DC input voltage source 180, the capacitive divider 120 with capacitive devices 122, the transformer 130 with primary windings 132 and secondary winding 134, the primary side switching devices 160, the diodes 142, 144, the output inductor 146, the output capacitor 148, the output load 150, the output voltage conditioner 152, the controller circuit 170, the relaxation winding 136 and the relaxation diode 162. Additionally, the forward converter 2300 includes the active snubber circuit, familiar from FIG. 22, connected across the $N^{th}$ primary winding 132-N.

The above-described implementations of the present application are intended to be examples only. Alterations, modifications and variations may be effected to the particular implementations by those skilled in the art without departing from the scope of the application, which is defined by the claims appended hereto.

What is claimed is:

1. A forward converter comprising:
an input voltage source, the input voltage source being divided into a plurality of divided input voltage sources, each of the divided input voltage sources providing a portion of a total input voltage of the input voltage source;
an output circuit including a first output circuit switching device, a second output circuit switching device, an output inductor, and an output capacitor;
a transformer having a plurality of primary windings coupled to a magnetic core, a secondary winding inductively coupled to the plurality of primary windings by being coupled to the magnetic core, and a relaxation winding inductively coupled to the magnetic core, wherein each primary winding among the plurality of primary windings is connected in series with a corresponding primary side switching device, a combination of the primary winding and the corresponding primary side switching device is in parallel with a corresponding divided voltage source among the plurality of divided input voltage sources, the secondary winding is connected to output an output voltage via the output circuit, and the relaxation winding is connected across the plurality of divided input voltage sources or the output capacitor;
a controller circuit connected to each of the primary side switching devices and adapted to control each of the primary side switching devices in a manner that controls power flow from the input voltage source to the output capacitor, the control based on receipt of an indication of a voltage across the output capacitor; and
a voltage snubbing circuit consisting of a passive snubber circuit consisting of a diode, a capacitor and a Zener diode;
and wherein:
the voltage snubbing circuit is connected in parallel across one of the plurality of primary windings; and
the voltage snubbing circuit is configured to reduce a voltage overshoot across one or more of the primary side switching devices and discharge a transformer leakage inductance of the transformer.

2. The forward converter of claim 1, further comprising:
a capacitive divider connected to the input voltage source and adapted to divide the total input voltage of the input voltage source into the plurality of divided input voltage sources through utilization of a plurality of series-connected capacitive devices, each of the series-connected capacitive devices being a divided input voltage source of the plurality of divided input voltage sources.

3. The forward converter of claim 2, wherein:
the primary side switching devices act to balance respective portions of the total input voltage of the input voltage source among the plurality of series-connected capacitive devices.

4. The forward converter of claim 2, further comprising:
a current sensing device connected between the input voltage source and the capacitive divider to measure a current through the primary side switching devices;
wherein the control is further based on receipt of an indication of the current measured by the current sensing device.

5. The forward converter of claim 1, further comprising:
a plurality of battery cells connected in a series connection of battery cells, the series connection of battery cells being the input voltage source, each battery cell of the plurality of battery cells being a divided input voltage source of the plurality of divided input voltage sources.

6. The forward converter of claim 1, wherein:
the controller circuit is configured to enable only one primary side switching device at a time.

7. The forward converter of claim 1, wherein:
one or more of the primary side switching devices comprises a metal-oxide-semiconductor field-effect transistor.

8. The forward converter of claim 1, wherein:
one or more of the primary side switching devices comprises a bipolar junction transistor.

9. The forward converter of claim 1, wherein:
one or more of the primary side switching devices comprises an insulated-gate bipolar transistor.

10. The forward converter of claim 1, wherein:
the input voltage source provides alternating current electricity, the forward converter further compromising a diode rectifier and an input filter.

11. The forward converter of claim 1, wherein:
the input voltage source provides direct current electricity.

12. The forward converter of claim 1, wherein:
the relaxation winding is connected across the plurality of divided input voltage sources via a diode.

13. The forward converter of claim 1, wherein:
the controller circuit is configured to operate each one of the primary side switching devices connected to the plurality of primary windings successively and repeatedly.

14. The forward converter of claim 1, wherein:
the controller circuit is configured to operate a magnetizing inductance of a primary winding among the plurality of primary windings in a continuous conduction mode.

15. The forward converter of claim 1, wherein:
the controller circuit is configured to operate a magnetizing inductance of a primary winding among the plurality of primary windings in a discontinuous conduction mode.

16. The forward converter of claim 1, wherein:
the controller circuit is configured to operate a magnetizing inductance of a primary winding among the plurality of primary windings in a boundary conduction mode.

17. A forward converter comprising:
an input voltage source, the input voltage source being divided into a plurality of divided input voltage sources, each of the divided input voltage sources providing a portion of a total input voltage of the input voltage source;
an output circuit including a first output circuit switching device, a second output circuit switching device, an output inductor, and an output capacitor;
a transformer having a plurality of primary windings coupled to a magnetic core, a secondary winding inductively coupled to the plurality of primary windings by being coupled to the magnetic core, and a relaxation winding inductively coupled to the magnetic core, wherein each primary winding among the plurality of primary windings is connected in series with a corresponding primary side switching device, a combination of the primary winding and the corresponding primary side switching device is in parallel with a corresponding divided voltage source among the plurality of divided input voltage sources, the secondary winding is connected to output an output voltage via the output circuit, and a series combination consisting of the relaxation winding and a diode is connected across the output capacitor; and
a controller circuit connected to each of the primary side switching devices and adapted to control each of the primary side switching devices in a manner that controls power flow from the input voltage source to the output capacitor, the control based on receipt of an indication of a voltage across the output capacitor.

18. The forward converter of claim 17, further comprising:
a capacitive divider connected to the input voltage source and adapted to divide the total input voltage of the input voltage source into the plurality of divided input voltage sources through utilization of a plurality of series-connected capacitive devices, each of the series-connected capacitive devices being a divided input voltage source of the plurality of divided input voltage sources.

19. The forward converter of claim 18, wherein:
the primary side switching devices act to balance respective portions of the total input voltage of the input voltage source among the plurality of series-connected capacitive devices.

20. The forward converter of claim 18, further comprising:
a current sensing device connected between the input voltage source and the capacitive divider to measure a current through the primary side switching devices;
wherein the control is further based on receipt of an indication of the current measured by the current sensing device.

21. The forward converter of claim 17, further comprising:
a plurality of battery cells connected in a series connection of battery cells, the series connection of battery cells being the input voltage source, each battery cell of the plurality of battery cells being a divided input voltage source of the plurality of divided input voltage sources.

* * * * *